(12) United States Patent
Fukui et al.

(10) Patent No.: US 10,140,115 B2
(45) Date of Patent: *Nov. 27, 2018

(54) APPLYING UPDATE TO SNAPSHOTS OF VIRTUAL MACHINE

(71) Applicant: International Business Machines Corporation, Armonk, NY (US)

(72) Inventors: Yuto Fukui, Tokyo (JP); Daisuke Hayashi, Tokyo (JP); Tomohiro Shioya, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,931

(22) Filed: Apr. 9, 2018

(65) Prior Publication Data

US 2018/0232225 A1 Aug. 16, 2018

Related U.S. Application Data

(63) Continuation of application No. 14/842,100, filed on Sep. 1, 2015.

(30) Foreign Application Priority Data

Oct. 28, 2014 (JP) ................................. 2014-219162

(51) Int. Cl.
*G06F 9/44* (2018.01)
*G06F 9/445* (2018.01)
(Continued)

(52) U.S. Cl.
CPC ............ *G06F 8/65* (2013.01); *G06F 9/45558* (2013.01); *G06F 2009/45562* (2013.01); *G06F 2009/45591* (2013.01)

(58) Field of Classification Search
CPC .................. G06F 8/65; G06F 9/45558; G06F 2009/45562; G06F 2009/45591
See application file for complete search history.

(56) References Cited

U.S. PATENT DOCUMENTS 6,829,617 B2 * 12/2004 Sawdon .............. G06F 11/1435
7,155,635 B1 12/2006 Phelps
(Continued)

FOREIGN PATENT DOCUMENTS

JP 2009122749 A 6/2009
JP 2010044613 A 2/2010
(Continued)

OTHER PUBLICATIONS

Ardalan Kangarlou, VNsnap: Taking Snapshots of Virtual Networked Infrastructures in the Cloud, 2012, pp. 484-495. https://ieeexplore.ieee.org/stamp/stamp.jsp?tp=&arnumber=5928311 (Year: 2012).*
(Continued)

*Primary Examiner* — Mongbao Nguyen
(74) *Attorney, Agent, or Firm* — Nicholas D. Bowman

(57) ABSTRACT

For automatically applying update to snapshots of a virtual machine (VM), a cloned virtual machine is created reproducing a state of an existing first snapshot of a virtual machine, a first virtual NIC in the cloned VM is disabled, an update is applied to the cloned VM to which a second virtual NIC has been added, the second virtual NIC is deleted from the cloned VM to which the update has been applied, the first virtual NIC is enabled, and a second snapshot of the cloned VM is generated with the enabled first virtual NIC wherein the second snapshot is associated with the virtual machine.

1 Claim, 18 Drawing Sheets

(51) Int. Cl.
*G06F 8/65* (2018.01)
*G06F 9/455* (2018.01)

(56) References Cited

U.S. PATENT DOCUMENTS

| | | | |
|---|---|---|---|
| 7,310,653 B2* | 12/2007 | Coyle | G06F 17/30306 |
| 7,657,721 B2 | 2/2010 | Nakano et al. | |
| 7,996,611 B2 | 8/2011 | Nakagawa et al. | |
| 8,032,351 B2 | 10/2011 | Stringham | |
| 8,171,485 B2* | 5/2012 | Muller | G06F 9/5027 |
| | | | 709/223 |
| 8,245,192 B1* | 8/2012 | Chen | G06F 8/71 |
| | | | 717/103 |
| 8,255,731 B1 | 8/2012 | Alsina et al. | |
| 8,321,380 B1 | 11/2012 | Leverett | |
| 8,332,842 B2* | 12/2012 | Bauer | G06F 11/1433 |
| | | | 717/120 |
| 8,566,541 B2 | 10/2013 | Choi et al. | |
| 8,695,010 B2 | 4/2014 | Frazier et al. | |
| 8,745,344 B2 | 6/2014 | Kito et al. | |
| 8,799,709 B2 | 8/2014 | Iikura et al. | |
| 8,949,312 B2* | 2/2015 | McLoughlin | G06F 8/63 |
| | | | 709/203 |
| 8,949,826 B2* | 2/2015 | Fitzgerald | G06F 9/45537 |
| | | | 718/1 |
| 8,984,104 B2* | 3/2015 | Morgan | H04L 41/0806 |
| | | | 709/220 |
| 9,110,699 B2* | 8/2015 | Bell | G06F 9/45533 |
| 9,116,846 B2 | 8/2015 | Vasilyev et al. | |
| 9,218,178 B2 | 12/2015 | Young et al. | |
| 9,244,674 B2 | 1/2016 | Waterman et al. | |
| 9,304,793 B2 | 4/2016 | Kannan et al. | |
| 9,361,089 B2 | 6/2016 | Bradfield et al. | |
| 9,454,363 B1* | 9/2016 | Angell | G06F 8/65 |
| 9,460,098 B2 | 10/2016 | Zhang et al. | |
| 9,588,793 B2* | 3/2017 | Warszawski | G06F 9/45558 |
| 9,727,274 B2 | 8/2017 | Baron et al. | |
| 9,747,125 B2 | 8/2017 | Husain et al. | |
| 2007/0156849 A1 | 7/2007 | Becker | |
| 2009/0217255 A1 | 8/2009 | Troan | |
| 2009/0228670 A1 | 9/2009 | Nakagawa et al. | |
| 2009/0282404 A1 | 11/2009 | Khandekar et al. | |
| 2010/0049929 A1 | 2/2010 | Nagarkar et al. | |
| 2010/0251004 A1 | 9/2010 | Schuba et al. | |
| 2010/0287544 A1 | 11/2010 | Bradfield et al. | |
| 2010/0293144 A1 | 11/2010 | Bonnet | |
| 2011/0010515 A1 | 1/2011 | Ranade | |
| 2011/0035802 A1* | 2/2011 | Arajujo, Jr. | G06F 11/079 |
| | | | 726/23 |
| 2011/0314131 A1 | 12/2011 | Naito | |
| 2012/0144391 A1 | 6/2012 | Ueda | |
| 2012/0174095 A1 | 7/2012 | Natchadalingam et al. | |
| 2013/0268920 A1* | 10/2013 | Ursal | G06F 8/70 |
| | | | 717/131 |
| 2014/0068594 A1 | 3/2014 | Young et al. | |
| 2014/0149354 A1 | 5/2014 | Chan et al. | |
| 2014/0149695 A1 | 5/2014 | Zaslavsky et al. | |
| 2014/0189677 A1 | 7/2014 | Curzi et al. | |
| 2014/0244950 A1 | 8/2014 | Baron et al. | |
| 2014/0365740 A1 | 12/2014 | Vasilyev et al. | |
| 2014/0372394 A1 | 12/2014 | Frankel et al. | |
| 2015/0142745 A1 | 5/2015 | Tekade et al. | |
| 2015/0142748 A1 | 5/2015 | Gottemukkula et al. | |
| 2015/0242282 A1 | 8/2015 | Gallagher | |
| 2015/0339144 A1 | 11/2015 | Cao | |
| 2016/0117163 A1 | 4/2016 | Fukui et al. | |
| 2016/0162278 A1 | 6/2016 | Kondik et al. | |

FOREIGN PATENT DOCUMENTS

| | | |
|---|---|---|
| JP | 2010073011 A | 4/2010 |
| JP | 2010262545 A | 11/2010 |
| JP | 2011501270 A | 1/2011 |
| JP | 2012118827 A | 6/2012 |
| JP | 2012168710 A | 9/2012 |

OTHER PUBLICATIONS

Ben Pfaff, Virtualization Aware File Systems: Getting Beyond the Limitations of Virtual Disks, 2006, pp. 353-365 https://www.usenix.org/legacy/event/nsdi06/tech/full_papers/pfaff/pfaff.pdf (Year: 2006).*

Guangjun Xie, ESnap—A Cached Dependent Snapshot System, 2007, pp. 783-788. http://ieeexplore.ieee.org/stamp/stamp.jsp?tp=&arnumber=4290428 (Year: 2007).*

Lei Yu, SNdisk: An Efficient Para-Virtualization Snapshot Mechanism for Virtual Disks in Private Clouds, 2011, pp. 20-25. http://citeseerx.ist.psu.edu/viewdoc/download?doi=10.1.1.406.8433&rep=rep1&type=pdf (Year: 2011).*

Fukui et al., "Method for Automatically Applying Update to Snapshots of Virtual Machine, Computer System for the Same, and Program for Computer System", JP Application No. 2014-219162, Filed Oct. 28, 2014, 98 pages.

Netto et al., "When Cloud Virtual Machine Images Need to Be Updated", 2013, pp. 884-887.

Scarfone et al., "Guide to Security for Full Virtualization Technologies", Recommendations of the National Institute of Standards and Technology, U.S. Department of Commerce, Jan. 2011, 35 pages.

Kozlowicz, J., "Green House Data Blog", Patching Best Practices for Virtual Machines and Servers, Aug. 13, 2014, 8 pages.

Tonosaki et al., "Efficiently Synchronizing Virtual Machines in Cloud Computing Environments", 2011 Third IEEE International Conference on Cloud Computing Technology and Science, pp. 154-162.

Fukui et al., "Applying Update to Snapshots of Virtual Machine", U.S. Appl. No. 15/947,923, filed Apr. 9, 2018.

IBM, List of IBM Patents or Patent Applications Treated as Related, Apr. 6, 2018, 2 pages.

* cited by examiner

APPLYING UPDATE TO SNAPSHOTS OF VIRTUAL MACHINE

CROSS REFERENCE TO RELATED APPLICATIONS

This Application is a Continuation of U.S. patent application Ser. No. 14/842,100, filed on Sep. 1, 2015, which claims the benefit of Japanese Patent Application No. 2014-219162, filed on Oct. 28, 2014.

BACKGROUND

The present invention relates to a technique for applying program updates. In particular, the present invention relates to a technique for automatically applying updates to snapshots of virtual machines.

With the recent prevalence of cloud services, there have been an increasing number of opportunities to utilize virtual machines (VMs) as well as physical machines. A virtual machine is a virtualization technique for computers. In a virtual machine, hardware is virtualized to enable a plurality of the same or different operating systems to operate on one computer. The virtual machine is a one-program execution environment for individual and completely independent operations.

However, like physical machines, virtual machines have the risk of being susceptible to attacks to vulnerabilities present in operating systems or application software.

Thus, there has been a demand to take security measures for the virtual machine (fix, for example, security fix or program fix) similarly to the physical machine in order to maintain security.

SUMMARY

In a first aspect according to the present invention, a method for automatically applying update to snapshots of a virtual machine, includes the steps, executed by a computer system, of: creating a clone of the virtual machine reproducing a state identical to a state of an existing snapshot; disabling a virtual network interface card (hereinafter referred to as a virtual NIC) in the virtual machine created as the clone (hereinafter referred to as the clone virtual machine) and adding another virtual NIC; applying update, via a network, to the clone virtual machine to which the another virtual NIC has been added; deleting the another virtual NIC from the clone virtual machine to which the update has been applied, to enable the disabled virtual NIC; and taking a snapshot of the clone virtual machine with the enabled virtual NIC to take a snapshot of the clone source virtual machine.

In a second aspect according to the present invention, a computer system for automatically applying update to snapshots of a virtual machine includes: clone creating means for creating a clone of the virtual machine reproducing a state identical to a state of an existing snapshot; clone virtual machine configuration managing means for disabling a virtual network interface card (hereinafter referred to as a virtual NIC) in the virtual machine created as the clone (hereinafter referred to as the clone virtual machine) and adding another virtual NIC; and update applying means for applying update, via a network, to the clone virtual machine to which the another virtual NIC has been added, wherein the clone virtual machine configuration managing means deletes the another virtual NIC from the clone virtual machine to which the update has been applied, to enable the disabled virtual NIC, and the computer system further includes snapshot taking means for taking a snapshot of the clone virtual machine with the enabled virtual NIC to take a snapshot of the clone source virtual machine.

In a third aspect of the present invention, a program for a computer system or a program product for the computer system for automatically applying update to snapshots of a virtual machine causes the computer system to execute the steps of the first aspect according to the present invention.

DETAILED DESCRIPTION

Figure 1A:
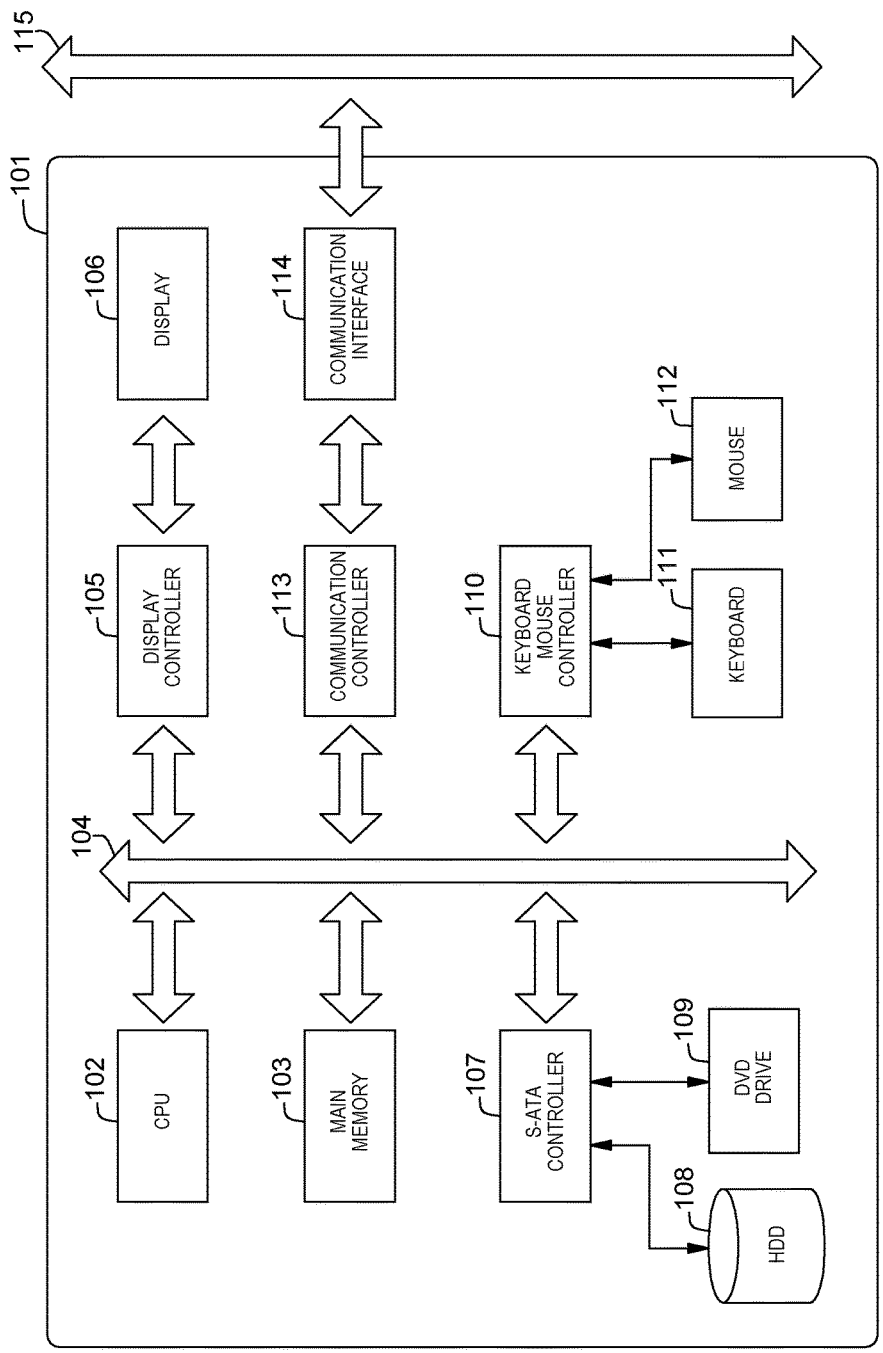
FIG. 1A is a diagram depicting an example of a computer system according to an embodiment of the present invention.

The snapshot is a static data set allowing saving of the state of a virtual machine at a certain point in time and used for a technique enabling the virtual machine to be recovered as needed to the state present at the point in time of saving.

The use of snapshots enables a plurality of states to be provided for one virtual machine.

However, it is very difficult to continuously apply updates of the program (for example, program updates or security updates) to all snapshots and to appropriately manage a large number of new snapshots resulting from the continuous application.

Furthermore, some virtual machines are operated to be recovered to a past state using snapshots.

However, in such an operation, the virtual machine recovers to a state in which the latest update to the program (for example, the program update or security update) has not been performed.

An embodiment of the present invention prevents operating a virtual machine for a long time with on a snapshot to which the latest update of a program has not been applied.

An embodiment of the present invention provides a technique for automatically applying updates to snapshots of a virtual machine. The technique may include a method for automatically applying updates to snapshots of a virtual machine, a computer system for automatically applying update to snapshots of a virtual machine, a program for the computer system, and a program product for the computer system.

In an embodiment of the present invention, the method may further include: a step, executed by the computer, of repeating the step of creating a clone of the virtual machine, the adding step, the applying step, the enabling step, and the step of taking the snapshot of the clone source virtual machine.

In an embodiment of the present invention, the repeating step may be executed: periodically; upon receiving a notification of the update; in accordance with control information on a taking frequency or a usage frequency of the existing snapshot or a snapshot associated with the existing snapshot; or using a user's action as a trigger.

In an embodiment of the present invention, the step of creating the clone of the virtual machine may further include a step of selecting, in accordance with a priority associated with the existing snapshot, or in accordance with a usage frequency or a usage time of the existing snapshot or a snapshot taking frequency of the existing snapshot, an existing snapshot used to create a clone virtual machine from a plurality of existing snapshots.

In an embodiment of the present invention, the priority may be provided to a user snapshot taken in accordance with a user's instruction.

In an embodiment of the present invention, the method may further include: a step, executed by the computer, of monitoring the usage frequency or the usage time of the existing snapshot or the snapshot taking frequency of the existing snapshot.

In an embodiment of the present invention, the existing snapshot may be a user snapshot taken in accordance with the user's instruction or a system snapshot taken in the step of taking the snapshot of the clone source virtual machine.

In an embodiment of the present invention, the existing snapshot of the clone source virtual machine may be the user snapshot, and on a management view, the system snapshot taken from the clone virtual machine in the user snapshot may be displayed in association with the user snapshot of the clone source virtual machine.

In an embodiment of the present invention, the existing snapshot of the clone source virtual machine may be the system snapshot, and on the management view, the system snapshot taken from the clone virtual machine in the system snapshot may be displayed in association with the system snapshot of the clone source virtual machine.

In an embodiment of the present invention, the method may further include: a step, executed by the computer, of merging at least two snapshots taken in the step of taking the snapshot of the clone source virtual machine.

In an embodiment of the present invention, the method may include: a step, further executed by the computer, of grouping the user snapshot taken in accordance with the user's instruction and the system snapshot taken in the step of taking the snapshot of the clone source virtual machine and displaying the grouped snapshots on the management view.

In an embodiment of the present invention, the step of creating the clone may include: a step of creating a clone of the virtual machine reproducing a state identical to a state of a latest system snapshot of the grouped system snapshots in response to selection of the grouped system snapshots.

In an embodiment of the present invention, the computer system may further execute the steps of: merging one or more system snapshots of the grouped snapshots not being latest, with a latest system snapshot; and deleting the one or more system snapshots not being the latest.

In an embodiment of the present invention, the computer system may further execute: a step of displaying, in response to selection of one of snapshot groups resulting from the grouping, snapshots belonging to the selected snapshot group on the management view.

In an embodiment of the present invention, the method may include: a step, further executed by the computer, of displaying an update information list of the update on the management view.

In an embodiment of the present invention, the step of adding the another virtual NIC may further include: a step of initiating the clone virtual machine to which the another virtual NIC has been added and assigning an unused IP address to the another virtual NIC.

In an embodiment of the present invention, the update may be performed using the IP address assigned to the another virtual NIC.

In an embodiment of the present invention, disabling the virtual NIC in the clone virtual machine may be performed by: disconnecting the virtual NIC from the network or preventing the virtual NIC from being recognized by an operating system for the clone virtual machine when the clone virtual machine is initiated.

In an embodiment of the present invention, enabling the disabled virtual NIC may be performed by: connecting disabled virtual NIC to the network; adding the disabled virtual NIC; or allowing the disabled virtual NIC to be recognized by the operating system for the clone virtual machine.

In an embodiment of the present invention, the clone creating means may select, in accordance with a priority associated with the existing snapshot, in accordance with control information on a taking frequency or a usage frequency of the existing snapshot or a snapshot associated with the existing snapshot, or in accordance with a usage frequency or a usage time of the existing snapshot or a snapshot taking frequency of the existing snapshot, an existing snapshot allowing a clone virtual machine to be created from a plurality of existing snapshots.

In an embodiment of the present invention, the priority may be provided for a user snapshot taken in accordance with a user's instruction.

In an embodiment of the present invention, the computer system may further include monitor means for monitoring the usage frequency or the usage time of the existing snapshot or the snapshot taking frequency of the existing snapshot.

In an embodiment of the present invention, the existing snapshot may be a user snapshot taken in accordance with the user's instruction or a system snapshot taken by taking the snapshot of the clone source virtual machine.

In an embodiment of the present invention, the computer system may further include management view display means for displaying snapshots, the existing snapshot of the clone source virtual machine may be the user snapshot, and the management view display means may display the system snapshot taken from the clone virtual machine in the user snapshot, on a management view in association with the user snapshot of the clone source virtual machine.

In an embodiment of the present invention, the computer system may further include management view display means for displaying snapshots, the existing snapshot of the clone source virtual machine may be the system snapshot, and the management view display means may display the system snapshot taken from the clone virtual machine in the system snapshot, on the management view in association with the system snapshot of the clone source virtual machine.

In an embodiment of the present invention, the computer system may further include snapshot managing means for merging at least two snapshots taken by taking the snapshot of the clone source virtual machine.

In an embodiment of the present invention, the snapshot managing means may group the user snapshot taken in accordance with the user's instruction and the system snapshot taken by taking the snapshot of the clone source virtual machine.

In an embodiment of the present invention, the computer system may further include management view display means for displaying snapshots, and the management view display means may display the snapshots grouped by the snapshot managing means, on the management view.

In an embodiment of the present invention, the clone creating means may create a clone of the virtual machine reproducing a state identical to a state of a latest system snapshot of the grouped system snapshots in response to selection of the grouped system snapshots.

In an embodiment of the present invention, the snapshot managing means may merge one or more system snapshots of the grouped snapshots not being latest, with a latest system snapshot, and delete the one or more system snapshots not being the latest.

In an embodiment of the present invention, the management view display means may display, in response to selection of one of snapshot groups resulting from the grouping, snapshots belonging to the selected snapshot group.

In an embodiment of the present invention, the computer system may further include update information list display means displaying an update information list of the update on the management view.

In an embodiment of the present invention, the clone virtual machine configuration managing means may initiate the clone virtual machine to which the another virtual NIC has been added and assign an unused IP address to the another virtual NIC.

In an embodiment of the present invention, the update applying means may perform the update using the IP address assigned to the another virtual NIC.

In an embodiment of the present invention, the clone virtual machine configuration managing means may disable the virtual NIC in the clone virtual machine by disconnecting the virtual NIC from the network or preventing the virtual NIC from being recognized by an operating system for the clone virtual machine when the clone virtual machine is initiated.

In an embodiment of the present invention, the clone virtual machine configuration managing means may enable the disabled virtual NIC by connecting the disabled virtual NIC to the network, adding the disabled virtual NIC, or allowing the disabled virtual NIC to be recognized by the operating system for the clone virtual machine.

A program for a computer system, according to an embodiment of the present invention, can be stored in any computer readable recording medium such as one or more flexible disks, MOs, CD-ROMs, DVDs, BDs, hard disk apparatuses, memory media connectable to USB, ROMs, MRAMs, or RAMs. For storage in the recording medium, the program for the computer system may be downloaded from another computer connected via a communication line, for example, a server computer, or replicated from another recording medium. Furthermore, the program for the computer system according to an embodiment of the present invention may be compressed or divided into a plurality of programs for storage in one or more recording media.

Furthermore, it should be noted that the program product for the computer system according to an embodiment of the present invention may of course be provided in various forms. The program product for the computer system according to an embodiment of the present invention may include a storage medium with the program for the computer system recorded therein or a transmission medium transmitting the program for the computer system.

It should be noted that the above-described summary of embodiments of the present invention does not enumerate all of needed features of the present invention but that combinations or sub-combinations of these components may be the present invention.

Of course, those skilled in the art may conceive various changes such as combining hardware components of the computer system used in an embodiment of the present invention with a plurality of machines such that the functions are distributed among the machines for implementation. Those changes are included in concepts of embodiments of the present invention. However, these components are illustrative, and not all of the components are essential components of the present invention.

Furthermore, embodiments of the present invention may be implemented as hardware, software, or a combination of hardware and software. A typical example of execution by the combination of hardware and software is execution in a computer system in which the program for the computer system is installed. In such a case, the program for the computer system is loaded into a memory in the computer system and executed to control the computer system to execute the process according to the present invention. The program for the computer system may be configured using any language, any code, or a group of commands that can be expressed by notation. Such a group of commands enables the computer system to execute the process according to an embodiment of the present invention by directly executing a particular function or after one or both of 1) conversion into another language, code, or notation and 2) replication to another medium.

According to an embodiment of the present invention, an update is automatically applied to all of the snapshots acquired at any time by a user. This enables prevention of a situation where a virtual machine based on a snapshot to which the latest update has not been applied is operated or where a virtual machine is inadvertently kept operating for a long period without application of the latest update. In particular, in an operation environment where the state of a virtual machine may be frequently changed using snapshots, it is useful to prevent the above-described situation where a virtual machine based on a snapshot to which the latest update has not been applied is operated or where a virtual machine is inadvertently kept in operation for a long period without application of the latest update.

Furthermore, according to an embodiment of the present invention, when a plurality of snapshots is present for one virtual machine, an update is automatically applied to each of the plurality of snapshots, enabling a reduction in application costs.

According to an embodiment of the present invention, with a virtual machine in operation, updates can be applied to snapshots other than a snapshot on which the current state of the virtual machine is based (that is, the snapshot in which the state on which the virtual machine currently in operation is based is recorded). Thus, service in operation on the virtual machine need not be stopped.

Additionally, according to an embodiment of the present invention, updates may be applied taking into account a possible difference among the priorities associated with snapshots, a possible difference in usage frequency or usage time among the snapshots, or a possible difference in snapshot taking frequency of an existing snapshot. Thus, even when the user has acquired a large number of snapshots, priorities can be provided to the snapshots before update is applied to the snapshots.

In addition, according to an embodiment of the present invention, the present invention can be applied to various updates. The present invention is not only applicable to update via a network, but also applicable to such update operations for other types of software as manually performed by the user, via scripting of the update operations.

An embodiment of the present invention will be described below with reference to the drawings. The same reference numerals denote the same objects throughout the drawings, unless otherwise stated. It should be understood that an embodiment of the present invention is intended to describe a suitable aspect of the present invention and not intended to limit the scope of the present invention to embodiments disclosed herein.

First, terms used in the present invention will be described below.

In an embodiment of the present invention, a "snapshot" is a static data set (that is, the contents of the data do not change) used to save the state of a virtual machine at a certain point in time (for example, a disk, a central processing unit (CPU), a memory, or a network interface card (NIC)) and used as needed in a technique for enabling the virtual machine to be recovered to the state at the point in time of saving.

A certain snapshot is a data set in which only information on differences from a directly preceding snapshot is stored. Furthermore, no such change as changes the state of the virtual machine when the snapshot is restored is made to acquired (that is, existing) snapshots. However, when one or more snapshots of a plurality of snapshots are deleted, the difference information in the deleted snapshots may be merged with a snapshot directly succeeding from the deleted snapshots. However, the merge of the difference information does not change the state of the virtual machine when the virtual machine is restored using the directly succeeding snapshot with which the difference information is merged.

As described above, since the snapshot is a static data set used to save the state of the virtual machine at a certain point in time, even when the virtual machine is in operation, a new virtual machine can be created (that is, cloned) by copying data based on the snapshot of the virtual machine in operation.

In an embodiment of the present invention, "existing snapshots" include user snapshots or system snapshots.

In an embodiment of the present invention, the "user snapshot" refers to a snapshot of the virtual machine in operation taken in accordance with an instruction of a user or an administrator (hereinafter also referred to as a user).

In an embodiment of the present invention, the "system snapshot" refers to a first-generation snapshot taken based on the "user snapshot" or an nth-generation (n is an integer of at least 2) snapshot further taken based on the "system snapshot".

In an embodiment of the present invention, "update" may also be referred to as fix. The update may include program update or security update. The program update or security update may include application of update, for example, update of a definition file for security software (including, for example, anti-virus software), or update via scripting of such update operations for other types of software as manually performed by the user.

FIG. 1A is a diagram depicting an example of a computer system that may be used in an embodiment of the present invention or a computer system according to an embodiment of the present invention. The computer system 121 may be, for example, one or more computers, for example, one or more server computers (which may be, for example, computers with a server function). However, an embodiment is not limited to these computer systems.

A computer system 101 includes one or more CPUs 102 and a main memory 103 that are connected to a bus 104. The CPU 102 is, for example, based on a 32- or 64-bit architecture.

A display 106, for example, a liquid crystal display (LCD), may be connected to the bus 104 via a display controller 105. Furthermore, the liquid crystal display (LCD) may be, for example, a touch panel display or a floating touch display. The display 106 may be used to display an object displayed by operation of software in operation on the computer system 101 (for example, a program for a computer system according to an embodiment of the present invention or various optional programs for a computer system in operation on the computer system 101 (for example, a program implementing a virtual environment)), using an appropriate graphic interface. Furthermore, the display 106 may output a screen for a management view according to an embodiment of the present invention.

A disk 108, for example, a hard disk or a solid state drive (SSD), may be optionally connected to the bus 104 via, for example, a SATA controller or an IDE controller 107.

A drive 109, for example, a CD, a DVD, or a BD drive may be optionally connected to the bus 104 via, for example, a SATA controller or an IDE controller 107.

A keyboard 111 or a mouse 112 may be optionally connected to the bus 104 via a peripheral device controller 110, for example, via a keyboard mouse controller or a USB bus.

The following may be stored in the disk 108 so as to be able to be loaded into the main memory 103: an operating system, for example, an operating system developed for a main frame processing environment, the program for the computer system according to an embodiment of the present invention, and various other optional programs for a computer system; and data.

Furthermore, for example, a program for a computer system that allows update to be automatically applied to snapshots of a virtual machine may be stored in the disk 108 so as to be able to be loaded into the main memory 103.

The disk 108 may be built in the computer system 101 or connected to the computer system 101 via a cable so that the computer system 101 can access the disk 108 or connected to the computer system 101 via a wired or wireless network so that the computer system 101 can access the disk 108.

The drive 109 may be used as needed to install a program, for example, an operating system, an application program, or the program for the computer system according to an embodiment of the present invention from a CD-ROM, a DVD-ROM, or a BD into the disk 108.

A communication interface 114 complies with, for example, the Ethernet® protocol. The communication interface 114 is connected to the bus 104 via a communication controller 113 and serves to connect the computer system 101 to a communication line 115 in a wired or wireless manner. The communication interface 114 provides a network interface layer for the TCP/IP communication protocol for the communication function of the operating system for the computer system 101. The communication line may be in, for example, a wireless LAN environment based on a wireless LAN connection standard, a Wi-Fi wireless LAN environment such as IEEE 802.11a/b/g/n, or a cellular network environment (for example, 3G, LTE, or 4G environment).

Figure 1B:
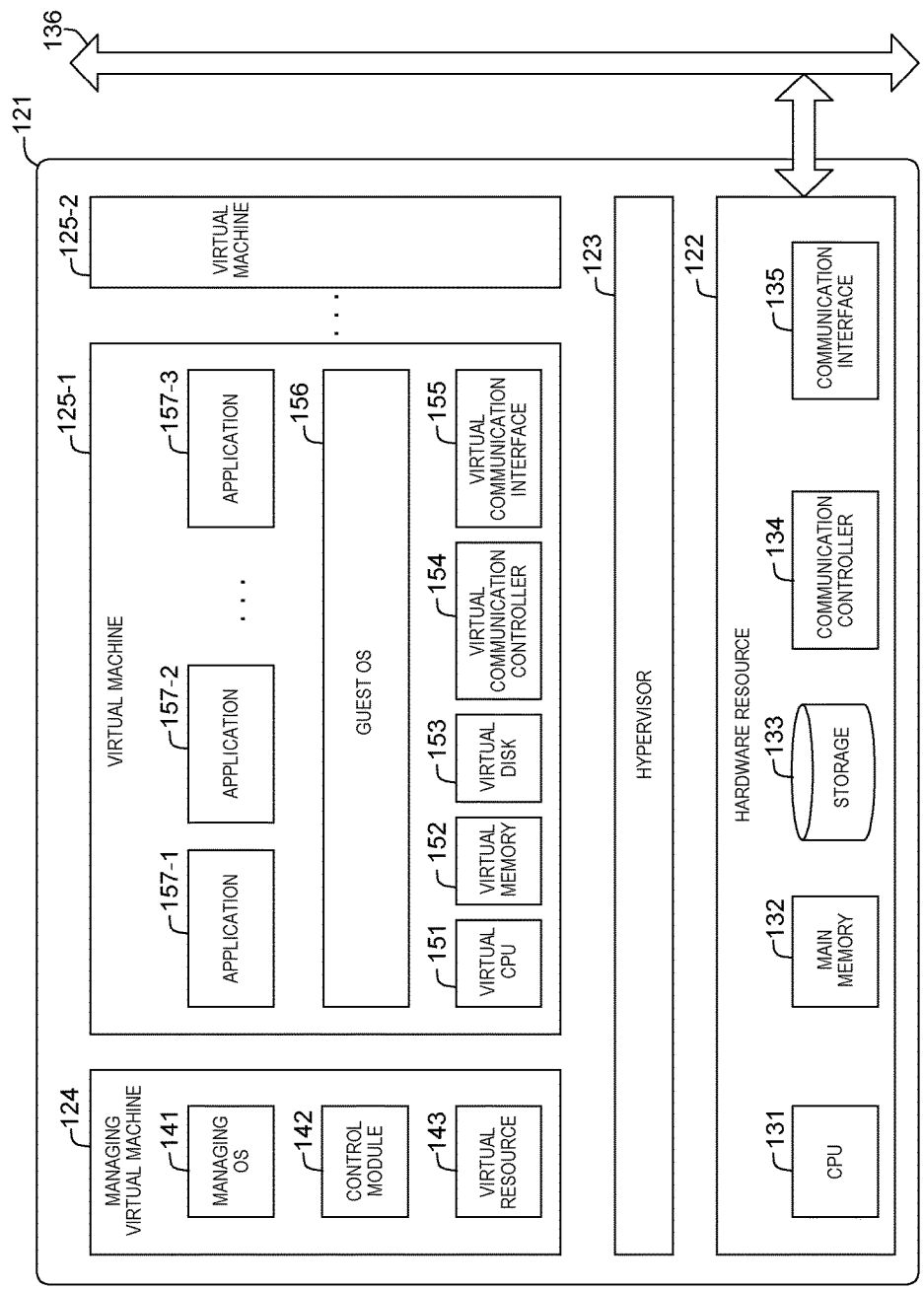
FIG. 1B is a diagram depicting an example of a computer system according to an embodiment of the present invention, in which one or more virtual machines are operated on the computer system.

FIG. 1B is a diagram depicting an example of a computer system that may be used in an embodiment of the present invention or a computer system according to an embodiment of the present invention, in which one or more virtual machines are operated on the computer system. The computer system 121 may be configured as a computer apparatus, for example, a workstation, a rack mount server, a blade server, a midrange, or a main frame.

The computer system 121 depicted in FIG. 1B may include, hardware resources 122, one or more CPUs 131, main memories 132, storages 133, communication controllers 134, and communication interfaces 135. The one or more CPUs 131, main memories 132, storages 133, communication controllers 134, and communication interfaces 135, and a communication line 136 correspond to the one or more CPUs 102, main memories 103, disks 108, communication controllers 113, and communication interfaces 114, and the communication line 115 of the computer system 101 depicted in FIG. 1A, respectively.

Furthermore, the computer system 121 operates as a physical host machine and can operate one or more virtual machines 125-1 to 125-2 (referred to as domain U or child partitions) on a hypervisor (also referred to as a virtualization monitor or virtualization OS) 123 for virtualization software, the virtual machines using the same or different OSs as guest OSs 156.

Furthermore, the computer system 121 can operate a managing virtual machine 124 (also referred to as a domain 0 or parent partition) on the hypervisor 123. The managing virtual machine 124 includes a managing OS 141, a control module 142 operating on the managing OS 141, and a virtual resource 143. The control module 142 is a module that issues commands to the hypervisor 123. Furthermore, the control module 142 issues commands to create the virtual machines 125-1 and 125-2 and to initiate the guest OS 156 to the hypervisor 123 to control operation of the virtual machines 125-1 and 125-2. The virtual resource 143 is the hardware resource 122 assigned for the managing virtual machine 124.

The virtual machines 125-1 and 125-2 include the virtual resources, the guest OSs 156, and various applications 157-1 to 157-3 operating on the guest OSs 156. The virtual resources include, for example, a virtual CPU 151, a virtual memory 152, a virtual disk 153, a virtual communication controller 154, and a virtual communication interface 155.

It should be understood that the citation of the computer system 121 below may refer to the computer system 101 depicted in FIG. 1A instead of the computer system 121 depicted in FIG. 1B.

FIGS. 2A to 2D are diagrams illustrating a process of taking a snapshot of a clone source virtual machine by creating a clone virtual machine for an existing snapshot and applying update to the clone virtual machine to take a snapshot to which the update is applied, according to an embodiment of the present invention, and a process of repeating the above-described process.

Figure 2A:
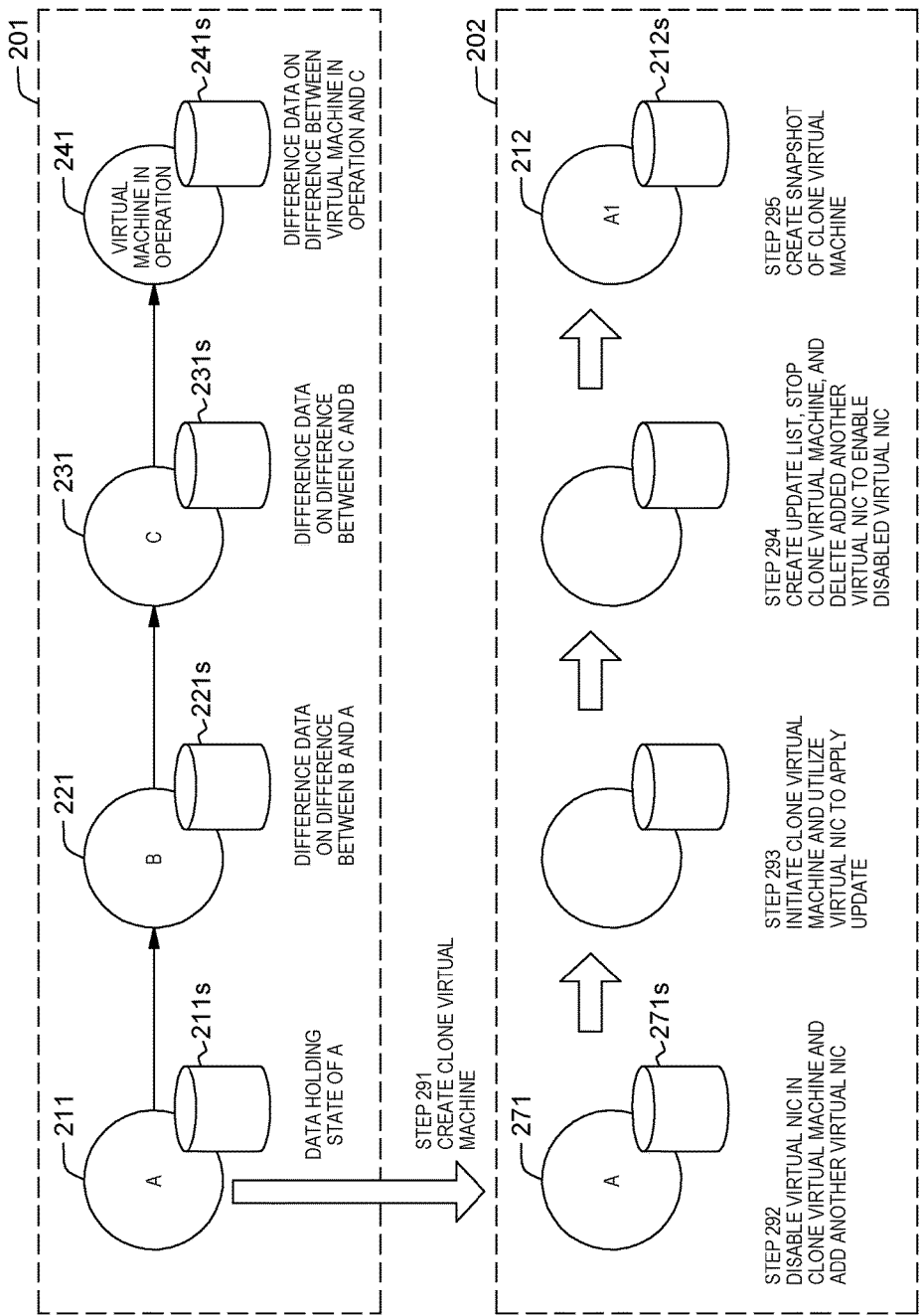
FIG. 2A is a diagram illustrating a process of taking a snapshot of a clone source virtual machine by creating a clone virtual machine for an existing snapshot and applying update to the clone virtual machine to take a snapshot to which the update is applied, according to an embodiment of the present invention.
Figure 2B:
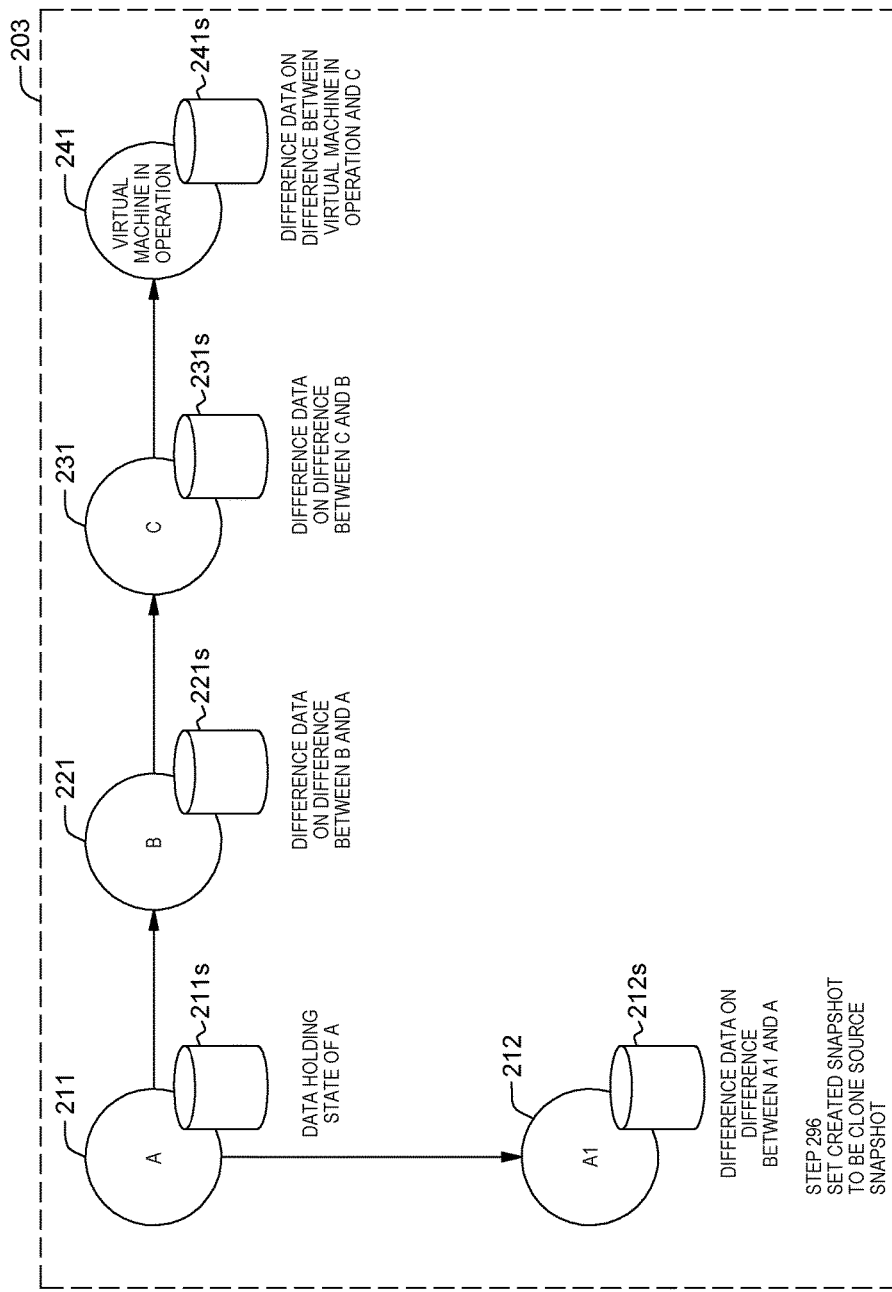
FIG. 2B is a diagram illustrating a process of taking a snapshot of a clone source virtual machine by creating a clone virtual machine for an existing snapshot and applying the update to the clone virtual machine to take a snapshot to which the update is applied, according to an embodiment of the present invention.

FIGS. 2A and 2B are diagrams illustrating the process of taking the snapshot of the clone source virtual machine by creating the clone virtual machine for the existing snapshot and applying update to the clone virtual machine to take the snapshot to which the update is applied, according to an embodiment of the present invention.

A user snapshot A 211, a user snapshot B 221, and a user snapshot C 231 depicted in an upper stage 201 in FIG. 2A are user snapshots (existing snapshots) of a virtual machine 241 being currently operated by a user.

The computer system 121 is a server computer that can operate a plurality of virtual machines, and is assumed to be currently operating a certain virtual machine.

In accordance with the user's instruction to take a snapshot, the computer system 121 takes the user snapshot A 211 of the operating virtual machine 241 at the point in time A of the instruction. The snapshot A 211 has data 211s holding the state at the point in time A. The data 211s is a static data and is not subjected to any change except for a change via merge with other data.

In accordance with the user's further instruction to take a snapshot, the computer system 121 subsequently takes the user snapshot B 221 of the operating virtual machine at the point in time B of the instruction. The user snapshot B 221 has data 221s holding difference data B–A on the difference of the state at the point in time B from the state at the point in time A. The data 221s is static data and is not subjected to any change except for a change via merge with other data.

In accordance with the user's further instruction to take a snapshot, the computer system 121 subsequently takes the user snapshot C 231 of the operating virtual machine at the point in time C of the instruction. The user snapshot C 231 has data 231s holding difference data C–A on the difference of the state at the point in time C from the state at the point in time B. The data 231s is static data and is not subjected to any change except for a change via merge with other data.

Furthermore, the computer system 121 updates the difference data 241s on the difference of the state of the virtual machine 241 currently in operation from the state at the point in time C as needed.

The process will be described below in which a snapshot of the clone source virtual machine is created by creating a clone virtual machine for the user snapshots A, B, and C (211, 221, and 231), which are the existing snapshots, and applying update to the clone virtual machine to take a snapshot to which the update is applied.

For the process of automatically applying update to the user snapshots, the computer system 121 monitors the usage frequencies or usage times of each of the user snapshots A, B, and C (211, 221, and 231). The computer system 121 determines, based on the monitor results, that the usage frequencies of the user snapshots A, B, and C (211, 221, and 231) are in an order of the user snapshot A 211, the user snapshot B 221, and the user snapshot C 231.

In step 291, in response to the user's action (for example, the user's instruction to take a system snapshot), the computer system 121 reads the user snapshot A 211 with the highest usage frequency and creates a clone of the virtual machine (hereinafter referred to as a clone virtual machine 271) that reproduces a state identical to the state of the user snapshot A 211. The computer system 121 creates the clone virtual machine 271 and data 271s based on data 211s holding the state of the user snapshot A 211.

In step 292, (see lower stage 202) the computer system 121 disables a virtual network interface card (hereinafter referred to as a virtual NIC) for the clone virtual machine 271, and adds another new virtual NIC. The reason why the virtual NIC is disabled and another virtual NIC is added is as follows. When the clone virtual machine 271 is initiated without any control, since an IP address already utilized by the clone source virtual machine is assigned to the clone virtual machine 271 without any change, the IP address overlaps between the virtual machine in operation and the clone virtual machine 271. Thus, even when the clone virtual machine 271 is initiated without any control, it is not preferable to utilize the clone virtual machine 271 without any control. A change in IP address leads to a change in the configuration of the virtual machine and is thus reflected in the snapshot. Thus, a change in IP address is not preferable. The virtual machine originally allows easy addition of virtual hardware (for example, a virtual CPU, a virtual memory, and a virtual NIC). Accordingly, the computer system 121 disables the originally connected virtual NIC without changing the IP address (that is, without deleting the virtual NIC), and instead adds the another virtual NIC to the clone virtual machine. The disabling is performed by, for example, disconnecting the originally connected virtual NIC from the network or preventing the originally connected virtual NIC from being recognized by the operating system for the clone virtual machine when the clone virtual machine is initiated.

The computer system 121 subsequently assigns an unused IP address to the another virtual NIC added to the clone virtual machine. The assignment of the unused IP address may be performed after the clone virtual machine 271 is initiated in step 293 described below.

In step 293, the computer system 121 initiates the clone virtual machine 271.

When no unused IP address is assigned to the another virtual NIC added to the clone virtual machine 271 in step 292, the computer system 121 adds an unused IP address to the another virtual NIC.

The computer system 121 subsequently applies update to the clone virtual machine 271 being initiated, via the network. The update may be what is called fix, for example, an update of a definition file for security software (including, for example, anti-virus software), or such update of other types of software as manually performed by the user (for example, update of the software via scripting). Furthermore, the computer system 121 may achieve the update using the IP address assigned to the clone virtual machine 271 being initiated.

In step 294, the computer system 121 creates an update information list in response to the end of the update. The computer system 121 may acquire the update information list by issuing, for example, an update information list acquisition command. The update information list may include, for example, the name of update target software, the identification number (for example, the version) of an update program, the issuer of the update program, the date and time of issuance of the update program or the date and time of application (installation) of the update program, or any combination thereof. The update information list may be displayed, for example, on the management view.

The computer system 121 subsequently stops the clone virtual machine 271 being initiated. The computer system 121 then disables the added another virtual NIC to release the IP address assigned to the clone virtual machine 271 in step 292 or step 293.

The computer system 121 further enables the disabled originally connected virtual NIC. The enabling may be performed by, for example, connecting the disabled virtual NIC to the network, adding the disabled virtual NIC, or allowing the disabled virtual NIC to be recognized by the operating system for the clone virtual machine.

In step 295, the computer system 121 acquires a system snapshot A1 212 of the clone virtual machine 271 to which the update has been applied. The system snapshot A1 212 has data 212s holding difference data A1–A on the difference of the state at the point in time A1 of taking of the system snapshot A1 212 from the state at the point in time A. The data 212s is static data and is not subjected to any change except for a change via merge with other data.

In step 296 (see FIG. 2B, process 203), the computer system 121 registers the system snapshot A1 212 taken in step 295 as a system snapshot A1 212 of the user snapshot A 211 that is a clone source. That is, the computer system 121 registers the taken system snapshot A1 212 in the form of a derivative of the user snapshot A 211 that is the clone source (for example, in such a manner that the system snapshot A1 212 is connected to the user snapshot A 211 as a branch).

Figure 2C:
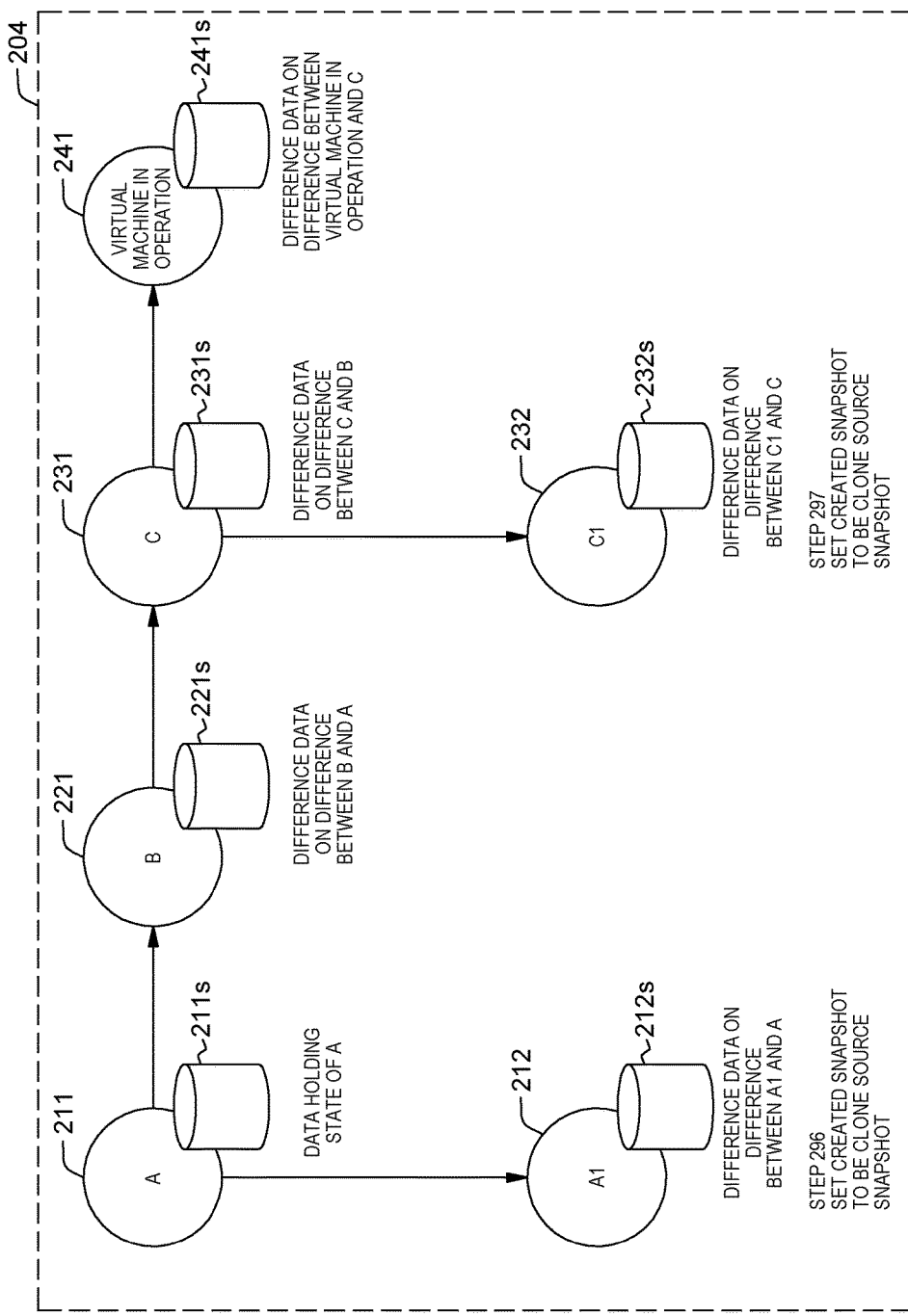
FIG. 2C is a diagram illustrating a process of taking a snapshot of the clone source virtual machine by creating a clone virtual machine for an existing snapshot different from the existing snapshot used in FIG. 2A and executing processing, according to an embodiment of the present invention.

FIG. 2C is a diagram illustrating a process 204 of taking a snapshot of the clone source virtual machine by creating a clone virtual machine for an existing snapshot (user snapshot C 231) different from the existing snapshot used in FIG. 2A (user snapshot A 211) and executing processing as is the case with the process depicted in FIG. 2A, according to an embodiment of the present invention.

In step 297, the computer system 121 reads a user snapshot C 231 that has the second highest usage frequency after the user snapshot A 211, and creates a clone of the virtual machine (clone virtual machine) that reproduces a state identical to the state of the user snapshot C 231. The computer system 121 then executes processing as is the case with steps 292 to 296 described above, and registers the taken system snapshot C1 232 as a system snapshot C1 232 of the user snapshot C 231 that is a clone source. That is, the computer system 121 registers the taken system snapshot C1 232 in the form of a derivative of the user snapshot C 231 that is the clone source (for example, in such a manner that the system snapshot C1 232 is connected to the user snapshot C 231 as a branch). The system snapshot C1 232 has data 232s holding difference data C1–C on the difference of the state at the point in time C1 of taking of the system snapshot C1 232 from the state at the point in time C. The data 232s is static data and is not subjected to any change except for a change via merge with other data.

Figure 2D:
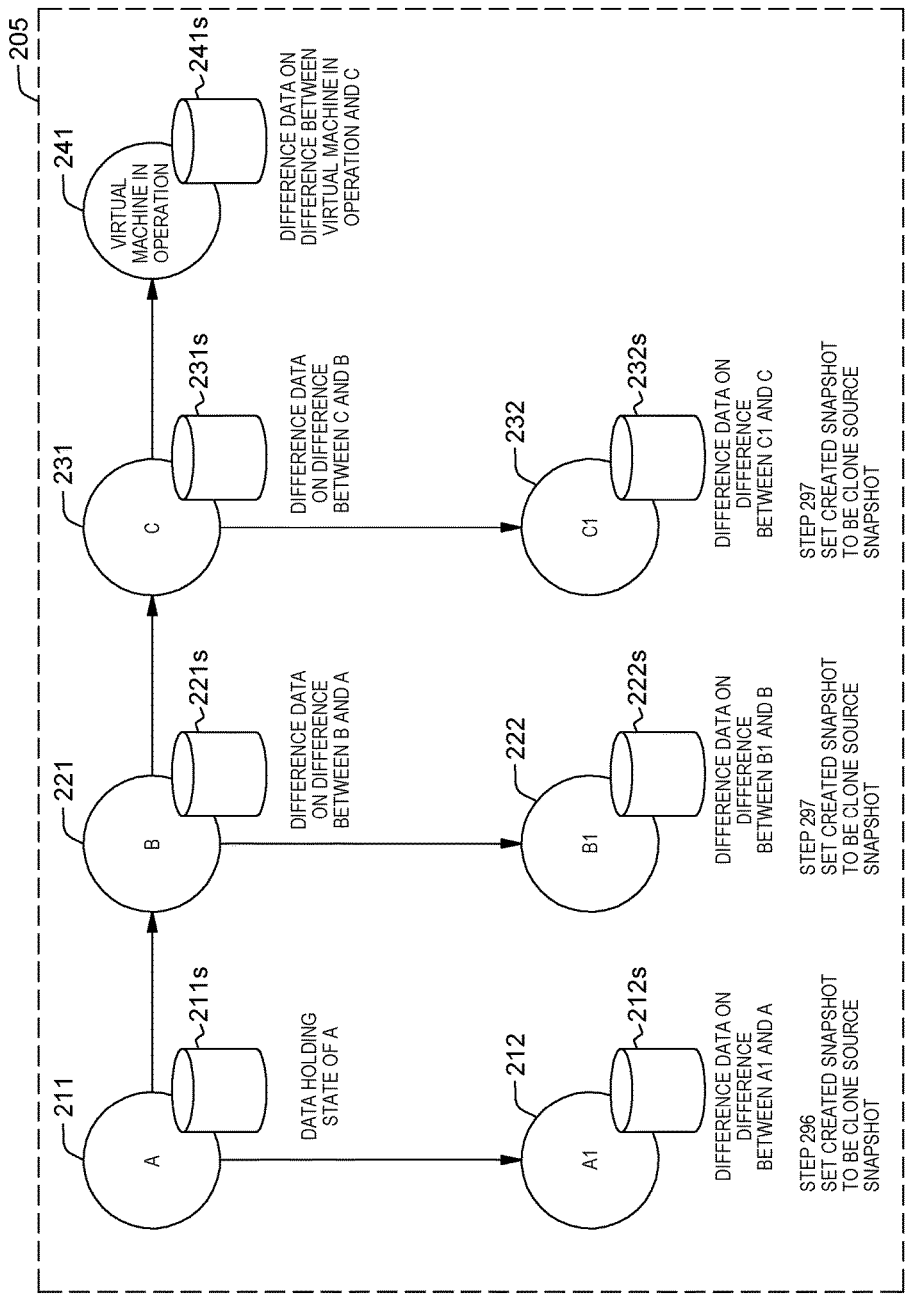
FIG. 2D is a diagram illustrating a process of taking a snapshot of the clone source virtual machine by creating a clone virtual machine for an existing snapshot different from the existing snapshot used in FIG. 2A and executing processing, according to an embodiment of the present invention.

FIG. 2D is a diagram illustrating the process 205 of taking a snapshot of the clone source virtual machine by creating a clone virtual machine for an existing snapshot (user snapshot B 221) different from the existing snapshot used in FIG. 2A (user snapshot A 211) and executing processing as is the case with the process depicted in FIG. 2A, according to an embodiment of the present invention.

In step 298, the computer system 121 reads a user snapshot B 221 that has the second highest usage frequency after the user snapshot C 231, and creates a clone of the virtual machine (clone virtual machine) that reproduces a state identical to the state of the user snapshot B 221. The computer system 121 then executes processing, as is the case with steps 292 to 296 described above, and registers the taken system snapshot B1 222 as a system snapshot B1 222 of the user snapshot B 221 that is a clone source. That is, the computer system 121 registers the taken system snapshot B1 222 in the form of a derivative of the user snapshot B 221 that is the clone source (for example, in such a manner that the system snapshot B1 222 is connected to the user snapshot B 221 as a branch). The system snapshot B1 222 has data 222s holding difference data B 1–B on the difference of the state at the point in time B1 of taking of the system snapshot B1 222 from the state at the point in time B. The data 222s is static data and is not subjected to any change except for a change via merge with other data.

As described above, a system snapshot to which update is applied can be taken for each of the plurality of user snapshots. Furthermore, for each of the plurality of user snapshots, it is possible to determine from which user snapshot the system snapshot is to be taken, that is, a priority can be set for each user snapshot based on the usage frequency or usage time of each user snapshot.

Then, the virtual machine is initiated based on the system snapshot to which the update is applied, to enable operation of the virtual machine to which the update is applied.

Figure 3:
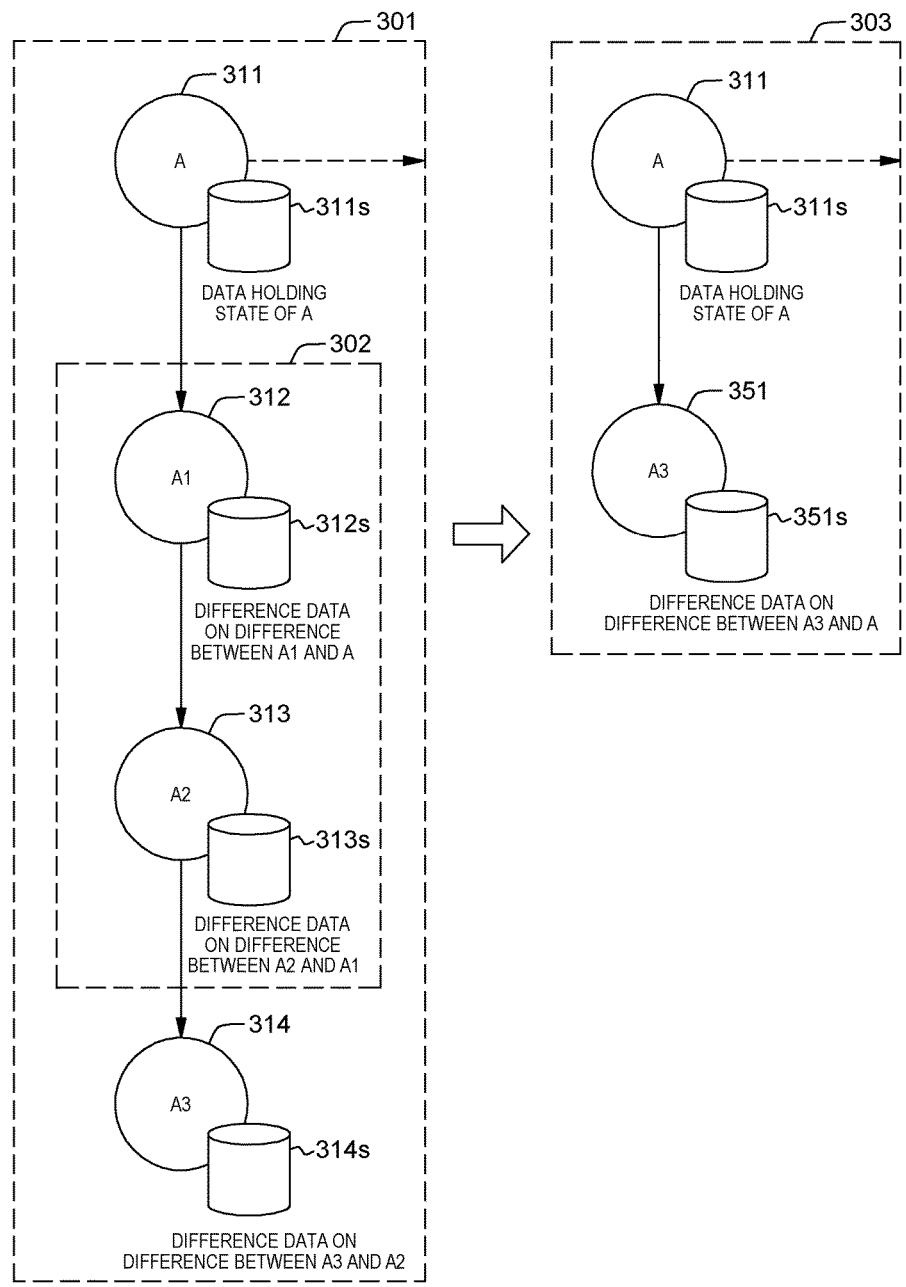
FIG. 3 is a diagram illustrating a process of deleting an intermediate system snapshot in a series of snapshots taken from a particular user snapshot, according to an embodiment of the present invention.

FIG. 3 is a diagram illustrating a process of deleting an intermediate system snapshot in a series of system snapshots taken from a particular user snapshot, according to an embodiment of the present invention.

A tree 301 depicted in the left of FIG. 3 indicates that, as is the case with the processing method depicted in FIG. 2A and FIG. 2B, a system snapshot A1 312 is taken from a user snapshot A 311 that is a clone source, then a system snapshot A2 313 is taken from the system snapshot A1 312, and then a system snapshot A3 314 is taken from the system snapshot A2 313. That is, the tree indicates that the system snapshot A1 312, the system snapshot A2 313, and the system snapshot A3 314 are taken in the form of derivatives of the user snapshot A 311.

The user snapshot A 311 has data 311s holding the state at the point in time A of taking of the user snapshot A 311. The data 311s is static data and is not subjected to any change except for a change via merge with other data.

The system snapshot A1 312 in tree 302 has data 312s holding difference data A1–A on the difference of the state at the point in time A1 of taking of the system snapshot A1 312 from the state at the point in time A. The data 312s is static data and is not subjected to any change except for a change via merge with other data.

The system snapshot A2 313 in tree 302 has data 313s holding difference data A2–A1 on the difference of the state at the point in time A2 of taking of the system snapshot A2 313 from the state at the point in time A1. The data 312s is static data and is not subjected to any change except for a change via merge with other data.

The system snapshot A3 314 has data 314s holding difference data A3–A2 on the difference of the state at the point in time A3 of taking of the system snapshot A3 314 from the state at the point in time A2. The data 314s is static data and is not subjected to any change except for a change via merge with other data.

The computer system 121 deletes the system snapshot A1 312 and the system snapshot A2 313 from the system snapshots A1 to A3 (312 to 314), located midway between the user snapshot A 311 and the latest system snapshot A3 314, and merges the system snapshots A1 312 and A2 313 with the system snapshot A3 314 when the user does not need the system snapshots A1 312 and A2 313 (for example, when the system snapshots A1 312 and A2 313 have low usage frequencies or short usage times).

To allow the system snapshot A1 312 and the system snapshot A2 313 to be deleted, the computer system 121 integrates the difference data on the system snapshot A1 312 and the system snapshot A2 313 with the difference data on the system snapshot A3 314.

A tree 303 depicted in the right of FIG. 3 indicates a system snapshot A3 351 merged as described above. The merged system snapshot A3 351 has data 351s holding difference data A3–A. The data 351s is static data and is not subjected to any change except for a change via merge with other data.

The merged data 351s in the snapshot A3 351 results from integration of the data 314s in the system snapshot A3 314 that has not been merged with the data 312s in the system snapshot A1 312 and the data 313s in the system snapshot A2 313 which have not been merged.

The need for an enormous number of system snapshots can be prevented by deleting and merging the intermediate system snapshot with another system snapshot (for example, the latest system snapshot) as described above.

Figure 4:
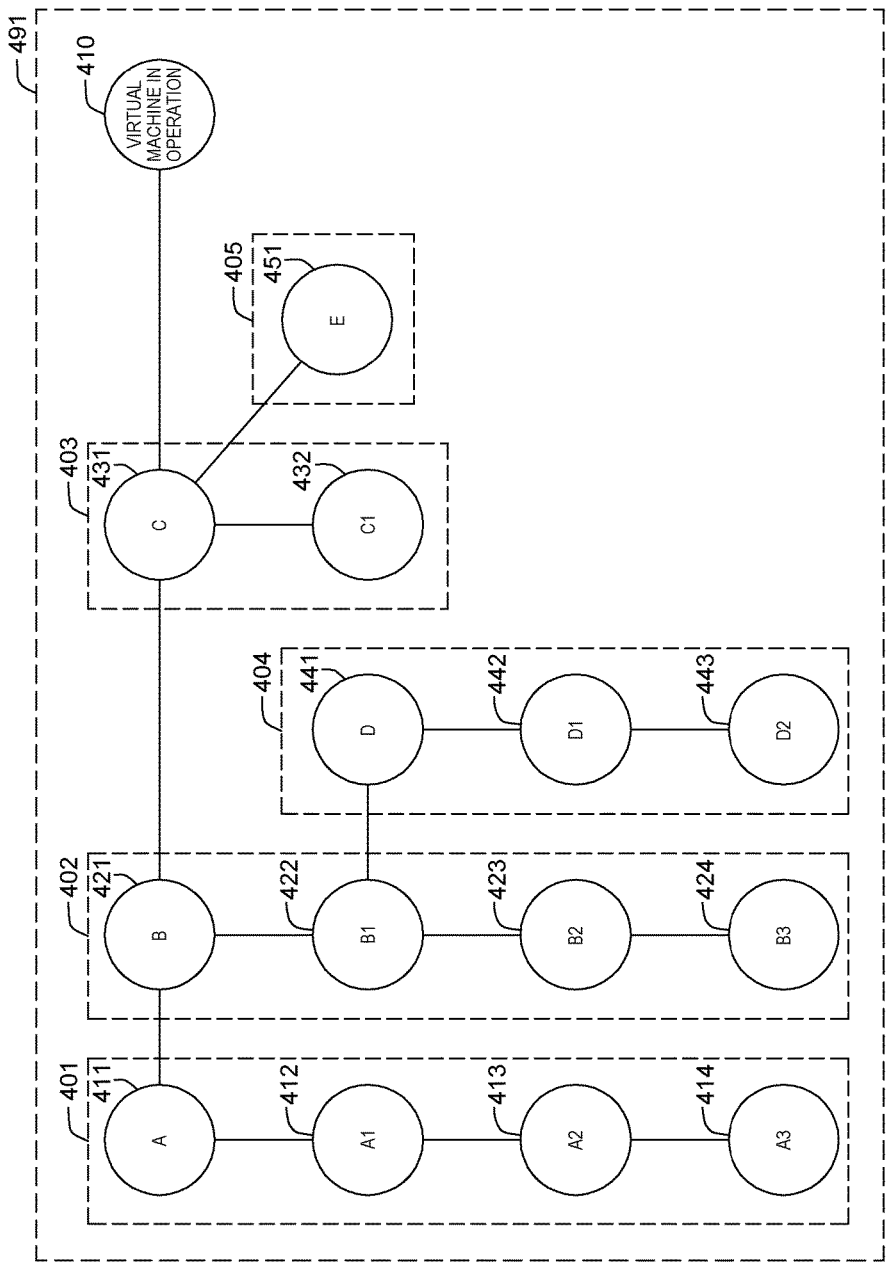
FIG. 4 is a diagram illustrating an aspect in which a user snapshot taken in accordance with a user's instruction and a system snapshot taken by taking a snapshot of the clone source virtual machine are grouped and in which the grouped snapshots are displayed on a management view, according to an embodiment of the present invention.

FIG. 4 is a diagram illustrating an aspect in which a user snapshot taken in accordance with a user's instruction and a system snapshot taken by taking a snapshot of the clone source virtual machine are grouped and in which the grouped snapshots are displayed on a management view, according to an embodiment of the present invention.

A management view 491 depicted in FIG. 4 illustrates a set of snapshots (including user snapshots and system snapshots) of a virtual system 410 currently in operation.

A user snapshot A 411, a user snapshot B 421, a user snapshot C 431, a user snapshot D 441, and a user snapshot E 451 have been taken in this order in accordance with the user's instructions to take snapshots.

A tree 401, a tree 402, a tree 403, a tree 404, and a tree 405 which will be described below illustrate snapshot groups originating from the above-described user snapshot A 411, user snapshot B 421, user snapshot C 431, user snapshot D 441, and user snapshot E 451, respectively. Each of the snapshot groups is a history diagram of snapshots originating from the user snapshot.

The tree 401 depicts that a system snapshot A1 412 is taken from the user snapshot A 411, which is a clone source, a system snapshot A2 413 is then taken from the system snapshot A1 412, and a system snapshot A3 414 is then taken from the system snapshot A2 413.

The tree 402 depicts that a system snapshot B1 422 is taken from the user snapshot B 421, which is a clone source, a system snapshot B2 423 is then taken from the system snapshot B1 422, and a system snapshot B3 424 is then taken from the system snapshot B2 423.

The tree 403 depicts that a system snapshot C1 432 is taken from the user snapshot C 431, which is a clone source.

The tree 404 depicts that a system snapshot D1 442 is taken from the user snapshot D 441, which is a clone source and a system snapshot D2 443 is then taken from the system snapshot D1 442.

The tree 405 depicts the user snapshot E 451.

The snapshots may be roughly classified into user snapshots and system snapshots, and can thus be managed by being divided into a group of the user snapshots and a group of the system snapshots. However, with an increased number of snapshots, displaying all of the group of user snapshots and the group of system snapshots may not be preferable for the user.

Thus, the computer system 121 may display a user snapshot and a series of system snapshots taken as derivatives of the user snapshot, as an entity (that is, a snapshot group of the user snapshots), as depicted in FIG. 4.

The computer system 121 may, for example, display different snapshot groups in different colors so as to make the snapshot groups distinguishable from one another.

Figure 5A:
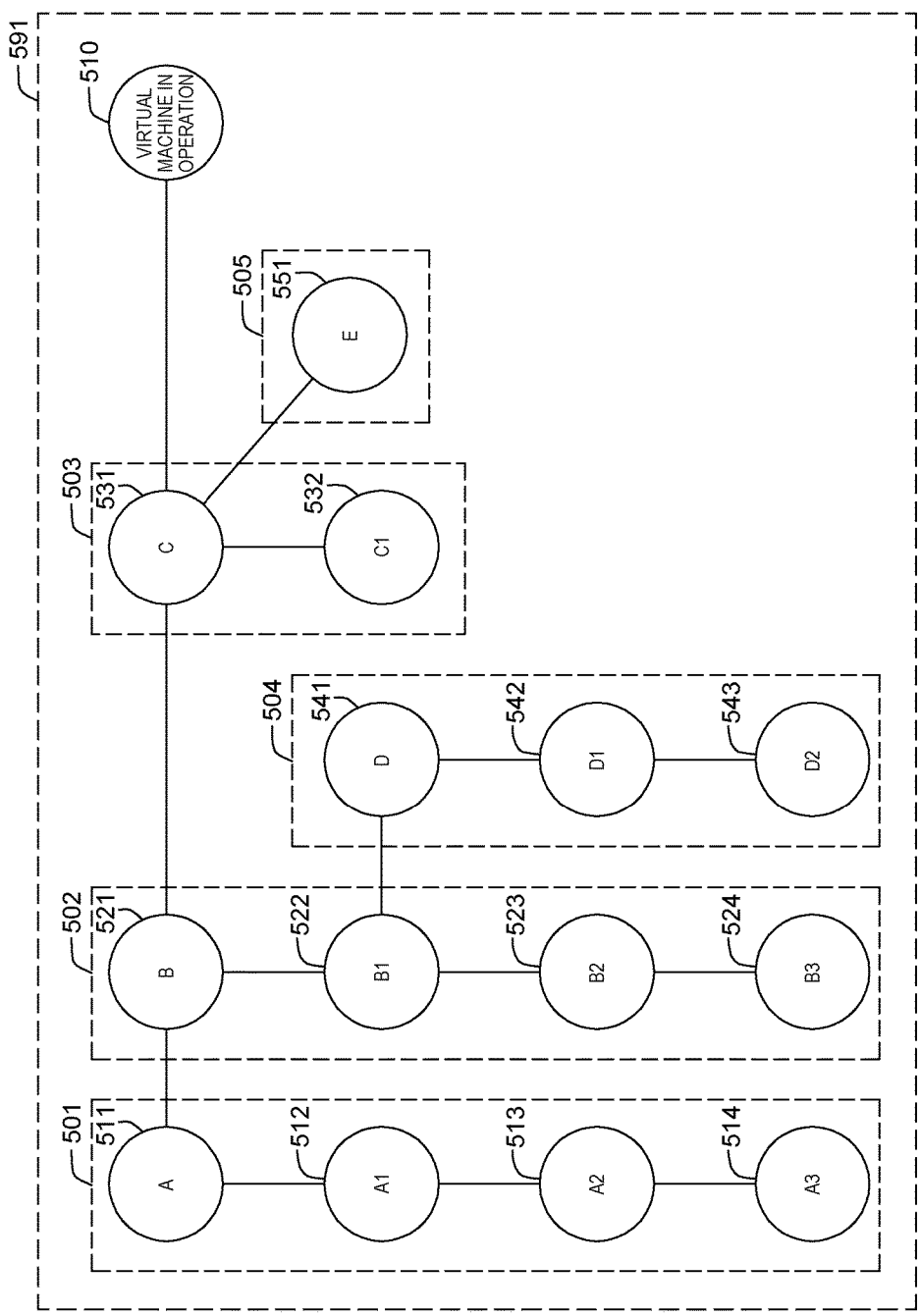
FIG. 5A is a diagram illustrating a process of grouping a particular user snapshot and a series of system snapshots taken as derivatives of the particular user snapshot, according to an embodiment of the present invention.
Figure 5B:
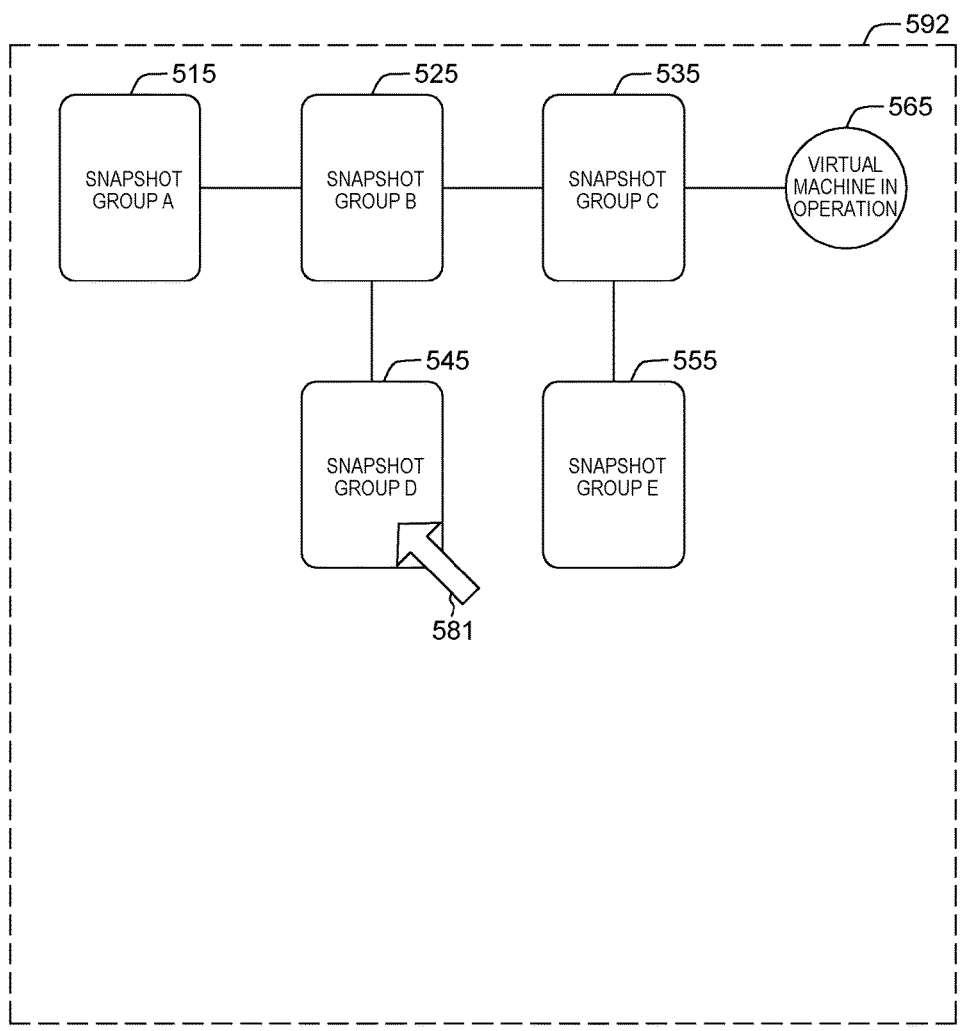
FIG. 5B is a diagram illustrating a management view displaying snapshot groups resulting from grouping of the particular user snapshot and the series of system snapshots taken as derivatives of the particular user snapshot, according to an embodiment of the present invention.
Figure 5C:
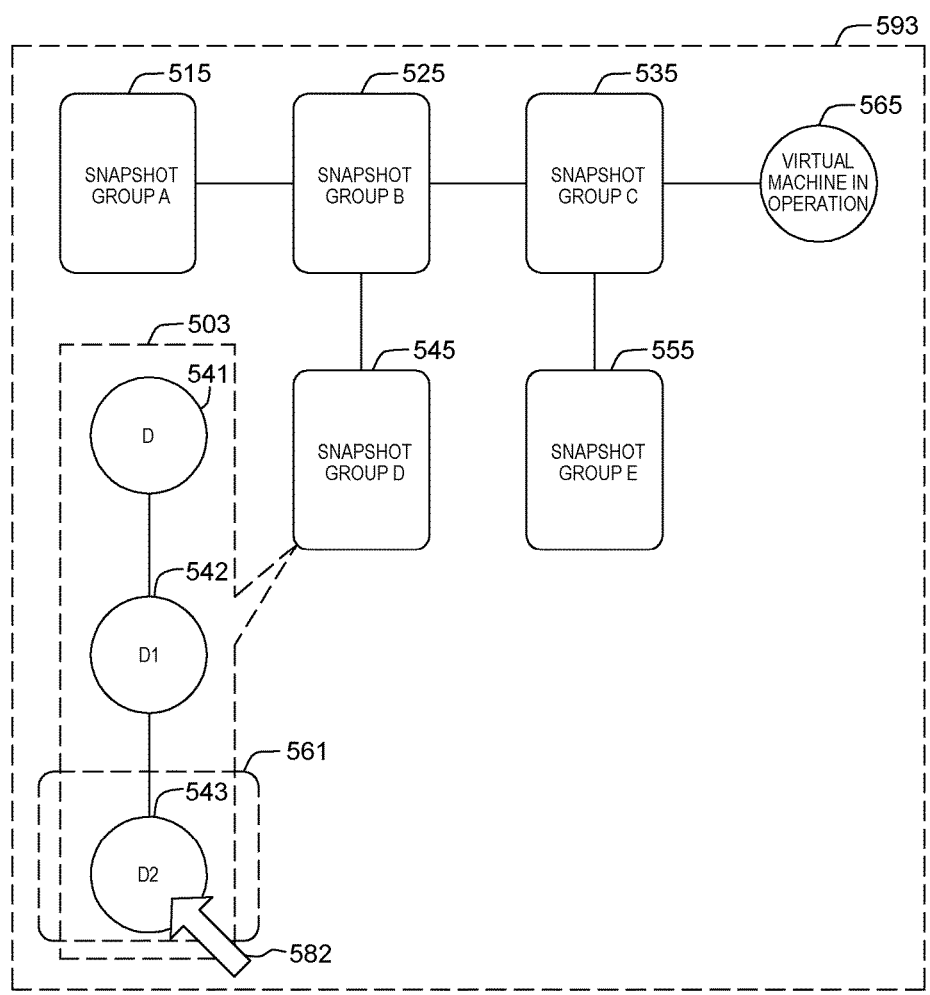
FIG. 5C is a diagram illustrating a management view displaying, when a particular snapshot group is selected on the management view, a user snapshot belonging to the selected snapshot group, and displaying, when the snapshot group includes a system snapshot, the system snapshot, according to an embodiment of the present invention.
Figure 5D:
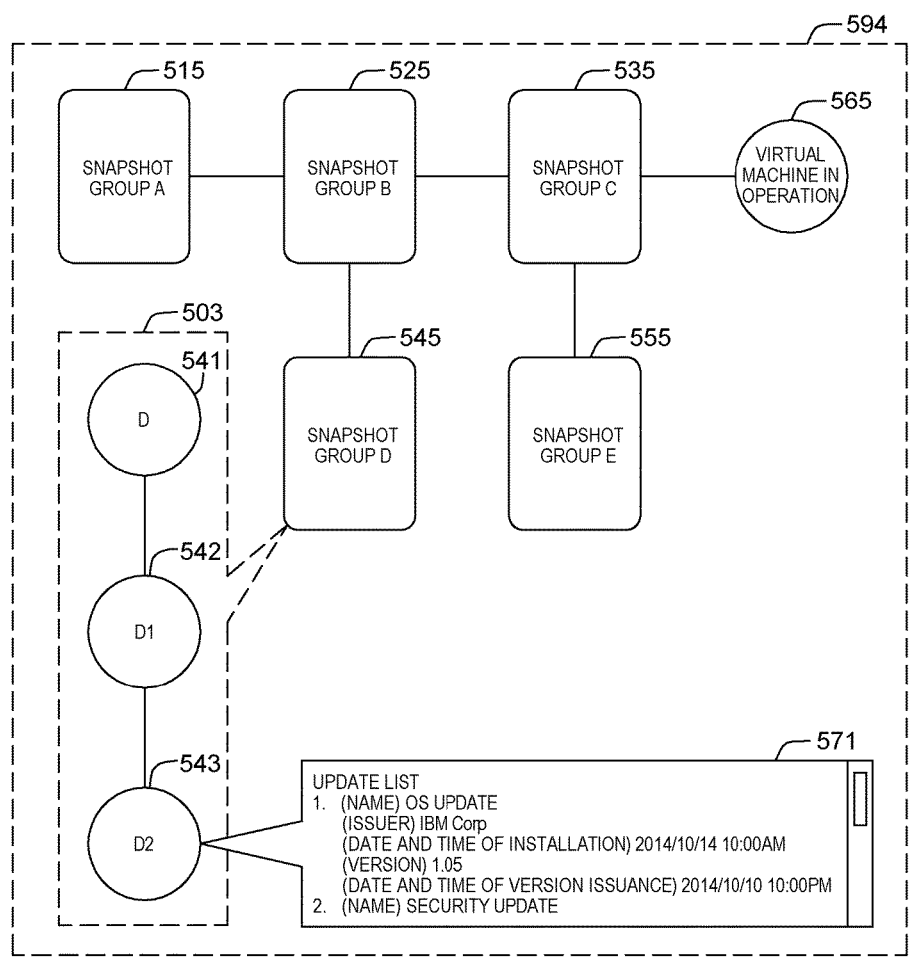
FIG. 5D is a diagram illustrating a management view displaying an update information list of a particular snapshot when, for example, a mouse cursor or an operating finger is placed on the snapshot on the management view, according to an embodiment of the present invention.

FIG. 5A and FIG. 5B are diagrams illustrating a process of grouping a particular user snapshot and a series of system snapshots taken as derivatives of the particular user snapshot and displaying the snapshots on a management view as a snapshot group, according to an embodiment of the present invention. FIG. 5C and FIG. 5D are diagrams each illustrating various operations on the management view.

FIG. 5A depicts a management view 591 displaying a user snapshot and system snapshots on which the grouping process has not been executed.

Trees (501 to 505) in the management view 591 correspond to trees (401 to 405) and virtual machine in operation 510 corresponds to virtual machine in operation 410 depicted in FIG. 4, respectively. Thus, for description of each of the trees (501 to 505), see the above description of FIG. 4.

FIG. 5B depicts a management view 592 displaying virtual machine in operation 565 and snapshot groups resulting from grouping, for each of the trees (501 to 505), of a user snapshot and a series of system snapshots taken as derivatives of the user snapshot.

The management view 592 depicts a snapshot A group 515, a snapshot B group 525, a snapshot C group 535, a snapshot D group 545, and a snapshot E group 555.

The snapshot A group 515 includes a user snapshot A 511 and a system snapshot A1 512, a system snapshot A2 513, a system snapshot A3 514 taken as derivatives of the user snapshot A 511.

The snapshot B group 525 includes a user snapshot B 521 and a system snapshot B1 522, a system snapshot B2 523, and a system snapshot B3 524 taken as derivatives of the user snapshot B 521.

The snapshot C group 535 includes a user snapshot C 531 and a system snapshot C1 532 taken as a derivative of the user snapshot C 531.

The snapshot D group 545 includes a user snapshot D 541 and a system snapshot D1 542 and a system snapshot D2 543 taken as derivatives of the user snapshot D 541.

The snapshot E group 555 includes only a user snapshot E 551.

As depicted in the management view 592, more concise display can be provided than on the management view depicted in FIG. 5A by grouping a particular user snapshot and a series of system snapshots taken as derivatives of the particular user snapshot.

The user may take various actions on the management view 592 in which the snapshots are grouped.

The following aspects of the various actions taken by the user on the management view 592 will be descried with reference to FIG. 5B, FIG. 5C, and FIG. 5D: (1) the user checks the snapshots belonging to a snapshot group, (2) the user views the update information list of a snapshot, and (3) the user operates a virtual system based on a particular snapshot.

(1) Aspect in which the User Checks the Snapshots Belonging to a Snapshot Group

It is assumed that, on the management view 592 depicted in FIG. 5B, the user clicks on an icon for the snapshot D group 545 using, for example, a left button of the mouse or the user's operating finger to select the icon 581. Alternatively, it is assumed that the user clicks an expansion and display button (not depicted in the drawings) on a an icon for the snapshot D group 545 using, for example, the left button of the mouse or the user's operating finger to select the icon.

In response to the selection of the icon for the snapshot D group 545, the computer system 121 displays the snapshots belonging to the snapshot D group 545.

FIG. 5C is a diagram illustrating a management view 593 that displays, in response to the selection of the icon for the snapshot D group 545 on the management view 592 depicted in FIG. 5B, the user snapshot D 541, and the system snapshots 542 and 543 belonging to the selected snapshot D group 545.

The computer system 121 displays, for example, another window 503 such that the window 503 blows out from the icon for the snapshot D group 545, and displays the user snapshot D 541 and the system snapshots 542 and 543 on the another window 503.

As described above, the user can visually understand the snapshots belonging to the snapshot D group 545. Furthermore, the user can select a snapshot belonging to the snapshot group from the expanded and displayed snapshots and operate the virtual machine based on the particular snapshot.

(2) Aspect in which the User Views the Update Information List of a Snapshot

It is assumed that, on a management view 593 depicted in FIG. 5C, the user clicks on an icon 561 for the system snapshot D2 543 using, for example, the left button of the mouse or the user's operating finger to select the system snapshot D2 543 582.

In response to the selection of the icon 561 for the system snapshot D2 543, the computer system 121 displays the update information list of the system snapshot D2 543.

FIG. 5D depicts a management view 594 that displays, in response to the selection of the icon for the system snapshot D2 543 on the management view 592, an update information list 571 of the selected system snapshot D 543.

The update information list 571 includes one or more update histories each including a set of a name (the name of software to be updated), an issuer (the issuer of an update program), the date and time of installation (the date and time of application of the update program), a version (the identification number of the update program), and the date and time of version issuance (the date and time of issuance of the update program).

The user can view update histories in a non-displayed area by operating a slide bar on the window of the update information list 571.

As described above, the user can visually understand the update information list of the snapshots. Furthermore, with reference to the update information list, the user can operate the virtual machine based on a particular snapshot.

(3) Aspect in which the User Operates the Virtual System Based on a Particular Snapshot It is assumed that the user is to operate the virtual system based on a certain snapshot. The user is assumed to be viewing the management view 592 depicted in FIG. 5B. The user selects a menu from which the virtual system can be initiated, from menus in the management view 592.

In response to the selection of the menu from which the virtual system is initiated, the computer system 121 enters an initiation mode for the virtual system.

It is assumed that, on the management view 592 depicted in FIG. 5B, the user clicks on an icon for the snapshot D group 545 under the initiation mode for the virtual system using, for example, the left button of the mouse or the user's operating finger to select the icon 581. Alternatively, the user is assumed to click a virtual system initiation button (not depicted in the drawings) on an icon for the snapshot D group 545 using the left button of the mouse or the user's operating finger to select the icon.

In response to the selection of the icon for the snapshot D group 545, the computer system 121 selects the snapshot D2 543, the latest one of the snapshots belonging to the snapshot D group 545 (default setting). When the selected snapshot group includes only a user snapshot, the computer system 121 selects the user snapshot.

The computer system 121 operates the virtual system based on the snapshot D2 543. Thus, the user can operate the virtual system based on the most recently updated snapshot D2 543, included in the snapshot D group 545.

Therefore, the user can automatically utilize the latest snapshot included in the selected snapshot group without being conscious of the snapshots belonging to the snapshot group.

Figure 6:
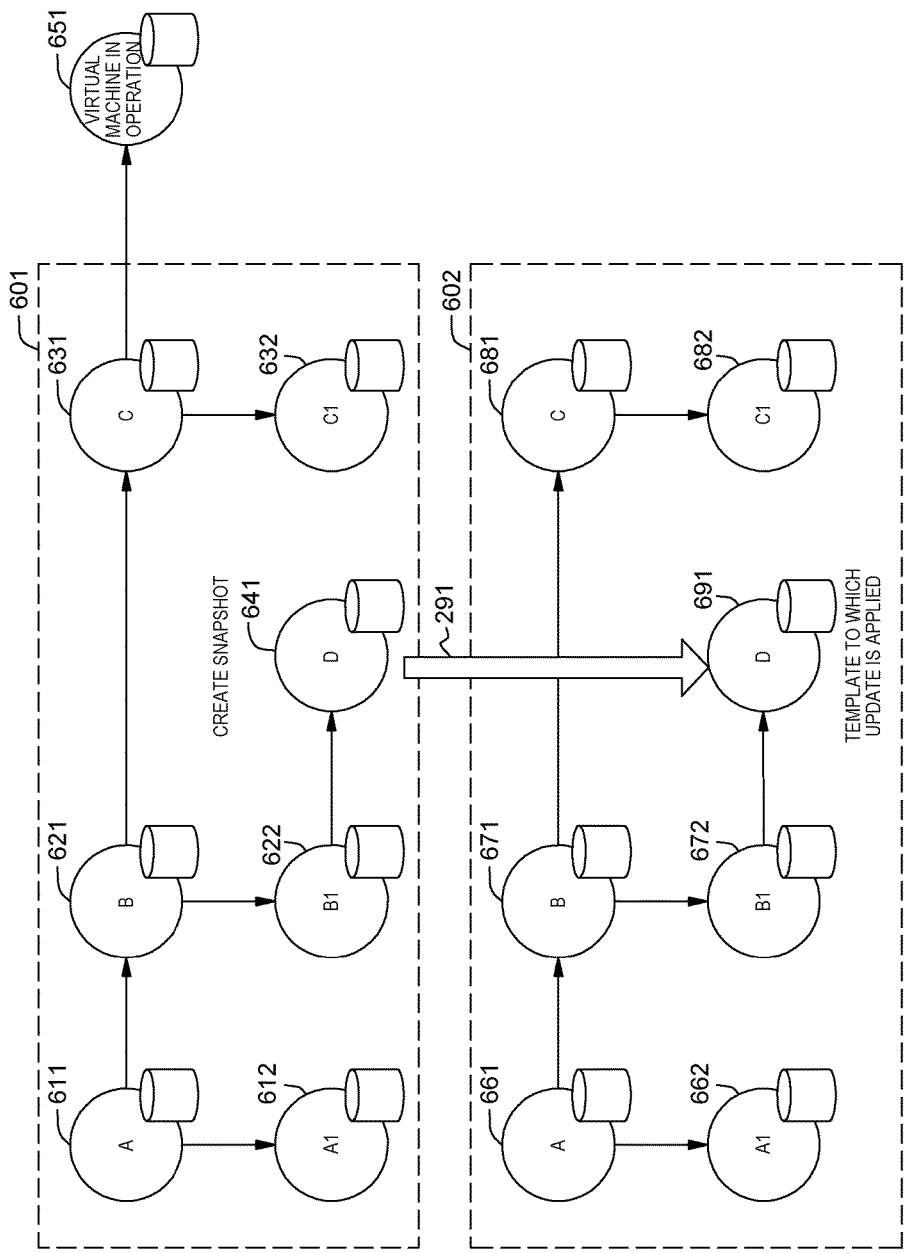
FIG. 6 is a diagram illustrating a process of copying a snapshot of a virtual machine in operation so as not to impose a load on the virtual machine in operation, according to an embodiment of the present invention.

FIG. 6 is a diagram illustrating a process of copying a snapshot of a virtual machine in operation so as not to impose a load on the virtual machine in operation, according to an embodiment of the present invention.

An aspect 601 depicted in an upper stage in FIG. 6 illustrates a user snapshot A 611, a system snapshot A1 612, a user snapshot B 621, a system snapshot B1 622, a user snapshot C 631, a system snapshot C1 632, and a user snapshot D 641 which are existing snapshots of a virtual machine 651 currently in operation.

To create a clone of the virtual machine that reproduces a state identical to the state of an existing snapshot (for example, the user snapshot D 641), it is necessary to access the user snapshot D 641 associated with the virtual machine currently in operation and to copy the user snapshot D 641 onto a virtual disk in another virtual machine. Thus, a load is imposed on, for example, I/Os of the virtual disk on the virtual machine currently in operation. This affects applications and the like which are in operation in the virtual machine. However, the user desires to suppress the adverse effect of access to and copying of the user snapshot D 641 on the virtual machine in operation.

Thus, when a snapshot is taken in the virtual machine in operation, the computer system 121 pre-copies the taken snapshot in the virtual disk on the another virtual machine utilizing a period of time when the disk I/O of the virtual machine in operation is low, each time the snapshot is taken or a predetermined number of the snapshots is taken.

Therefore, for example, the computer system 121 copies the user snapshot D 641 into the virtual disk on the another virtual machine during the period of time when the disk I/O of the virtual machine in operation is low.

An aspect 602 in a lower stage in FIG. 6 indicates an aspect in which the snapshots depicted in the aspect 601 illustrated in the upper stage in FIG. 6 are copied to the virtual disk on the another virtual machine. The aspect 602 being copied is an update applied template in which update is applied to the snapshot.

As described above, a snapshot of the virtual machine currently in operation is copied into the disk on the another virtual machine, and the copied snapshot (e.g., 661, 662, 671, 672, 681, 682, or 691) (which is the same as the snapshot of the virtual machine currently in operation) is held as a template to which update to the virtual machine currently in operation is applied. The computer system 121 applies update to the snapshot in the template to which the update is applied. Hence, disc I/Os needed each time a clone virtual machine is created are performed only when the template to which the update is applied is created.

As described above, the load on the disk I/Os of the virtual machine currently in operation can be reduced.

Figure 7:
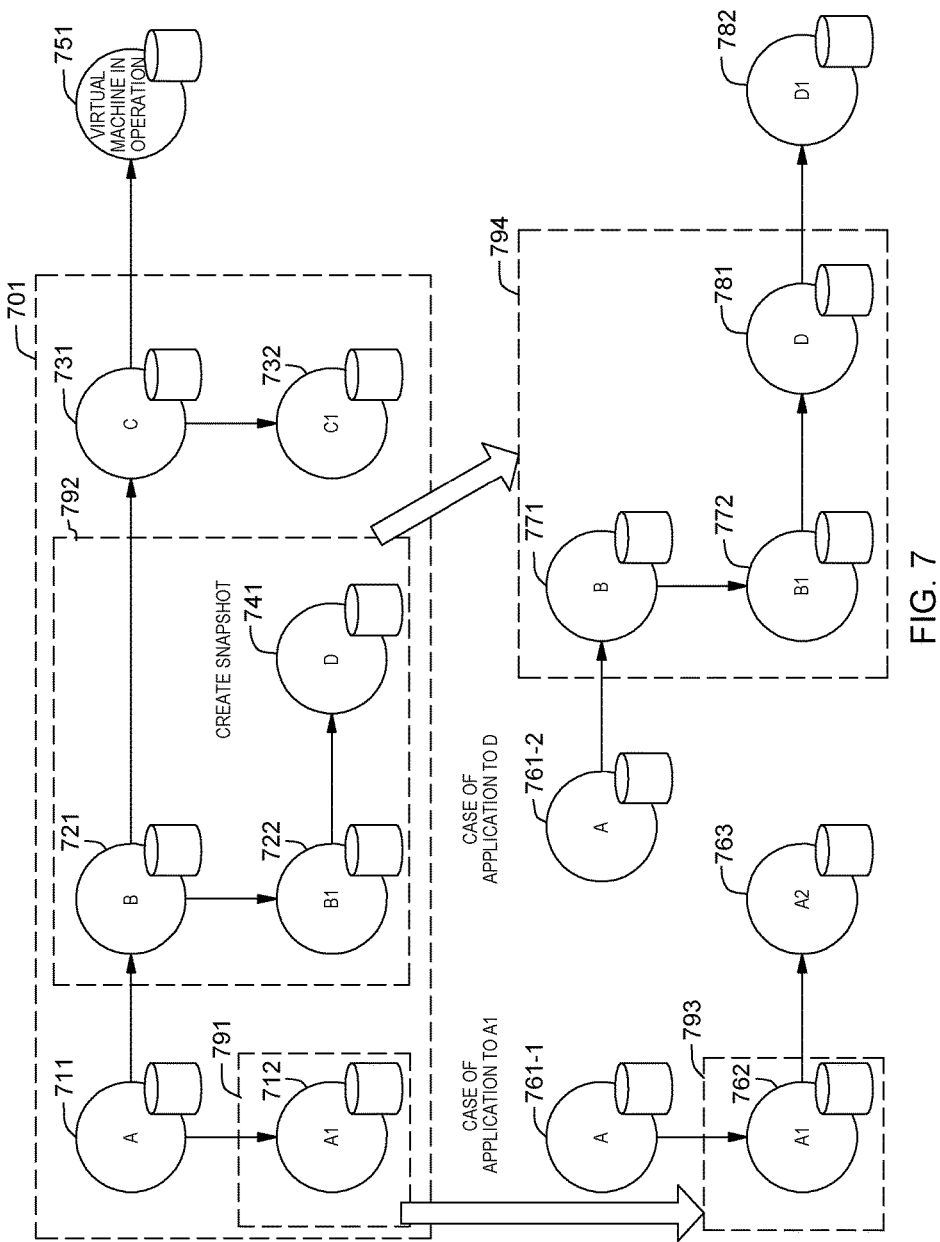
FIG. 7 is a diagram illustrating a process of copying a snapshot of a virtual machine in operation so as not to impose a load on the virtual machine in operation, according to an embodiment of the present invention.

FIG. 7 is a diagram illustrating a process of copying a snapshot of a virtual machine in operation so as not to impose a load on the virtual machine in operation, according to an embodiment of the present invention.

An aspect 701 depicted in an upper stage in FIG. 7 illustrates a user snapshot A 711, a system snapshot A1 712 within an aspect 791, a user snapshot B 721, a system snapshot B1 722, a user snapshot C 731, a system snapshot C1 732, and a user snapshot D 741 which are existing snapshots of a virtual machine 751 in operation Aspect 792 includes snapshot B 721, snapshot B1 722, and snapshot D 741.

To create a clone of the virtual machine that reproduces a state identical to the state of an existing snapshot (for example, the user snapshot A1 712 or the user snapshot D 741), it is necessary to access the user snapshot A1 712 or user snapshot D 741 associated with the virtual machine currently in operation and to copy the user snapshot A1 712 or the user snapshot D 741 onto a virtual disk in another virtual machine. Thus, a load is imposed on, for example, I/Os of the virtual disk on the virtual machine currently in operation. This affects applications and the like which are in operation in the virtual machine. However, the user desires to suppress the adverse effect of access to and copying of the user snapshot A1 712 or the user snapshot D 741 on the virtual machine in operation.

Thus, in applying update to each snapshot, the computer system 121 pre-transfers a plurality of copies of the user snapshot A1 712 included in the existing snapshots and serving as a base onto virtual disks on one or more other virtual machines different from the virtual machine currently in operation (761-1 and 761-2).

(Case where Update is Applied to A1)

Instead of registering the user snapshot A1 712 for the user snapshot A 711 stored on the virtual machine in operation, the computer system 121 registers a user snapshot A1 762 taken as a derivative of the user snapshot A 711 for the user snapshot A 761-1 pre-copied onto the virtual disks on the one or more other virtual machines, as a snapshot derived from the user snapshot A 761-1 793. Thus, the snapshot A1 762 derived from the user snapshot A 761-1 is registered on the virtual disks on the one or more other virtual machines different from the virtual machine currently in operation.

It is assumed that the computer system 121 subsequently takes a system snapshot A2 763 from the system snapshot A1 762 taken on virtual disks on the one or more other virtual machines. The computer system 121 registers a system snapshot A2 763 taken as a derivative of the system snapshot A1 762 for the system snapshot A1 762 taken on the virtual disks on the one or more other virtual machines. Thus, the system snapshot A2 763 derived from the system snapshot A1 762 is registered on the virtual disks on the one or more other virtual machines different from the virtual machine currently in operation.

In response to the registration of the system snapshot A2 763 on the virtual disks on the one or more other virtual machines, the computer system 121 may delete the system snapshot A1 762, while leaving the system snapshot A2 763 and the user snapshot A 761-1, which is a base. The computer system 121 integrates difference data on the deleted system snapshot A1 762 with difference data on the system snapshot A2 763.

(Case where Update is Applied to D)

Instead of registering the user snapshot B 721, the system snapshot B1 722, and the user snapshot D 741 for the user snapshot A 711 stored on the virtual machine in operation, the computer system 121 registers a user snapshot B 771, a system snapshot B1 772, and a user snapshot D 781 for the user snapshot A 761-2 pre-copied onto the virtual disks on the one or more other virtual machines 794.

It is assumed that the computer system 121 subsequently takes a system snapshot D1 782 from the user snapshot D 781 taken on virtual disks on the one or more other virtual machines. The computer system 121 registers a system snapshot D1 782 taken as a derivative of the user snapshot D 781 for the user snapshot D 781 taken on the virtual disks on the one or more other virtual machines. Thus, the system snapshot D1 782 derived from the user snapshot D 781 is registered on the virtual disks on the one or more other virtual machines different from the virtual machine currently in operation.

In response to the registration of the system snapshot D1 782 on the virtual disks on the one or more other virtual machines, the computer system 121 may delete the user snapshot B 771, the system snapshot B1 772, and the user snapshot D 781, while leaving the system snapshot D1 782 and the user snapshot A 761-2, which is a base. The computer system 121 integrates difference data on the deleted user snapshot B 771, system snapshot B1 772, and user snapshot D 781 with difference data on the system snapshot D1 782.

As described above, the snapshot serving as a base for the virtual machine currently in operation (the snapshot that may be a user snapshot) is copied into the disk on another virtual machine, and the copied snapshot serving as a base is held as a template to which update to the virtual machine currently in operation is applied. The computer system 121 then applies the update to the snapshot in the template.

Figure 8:
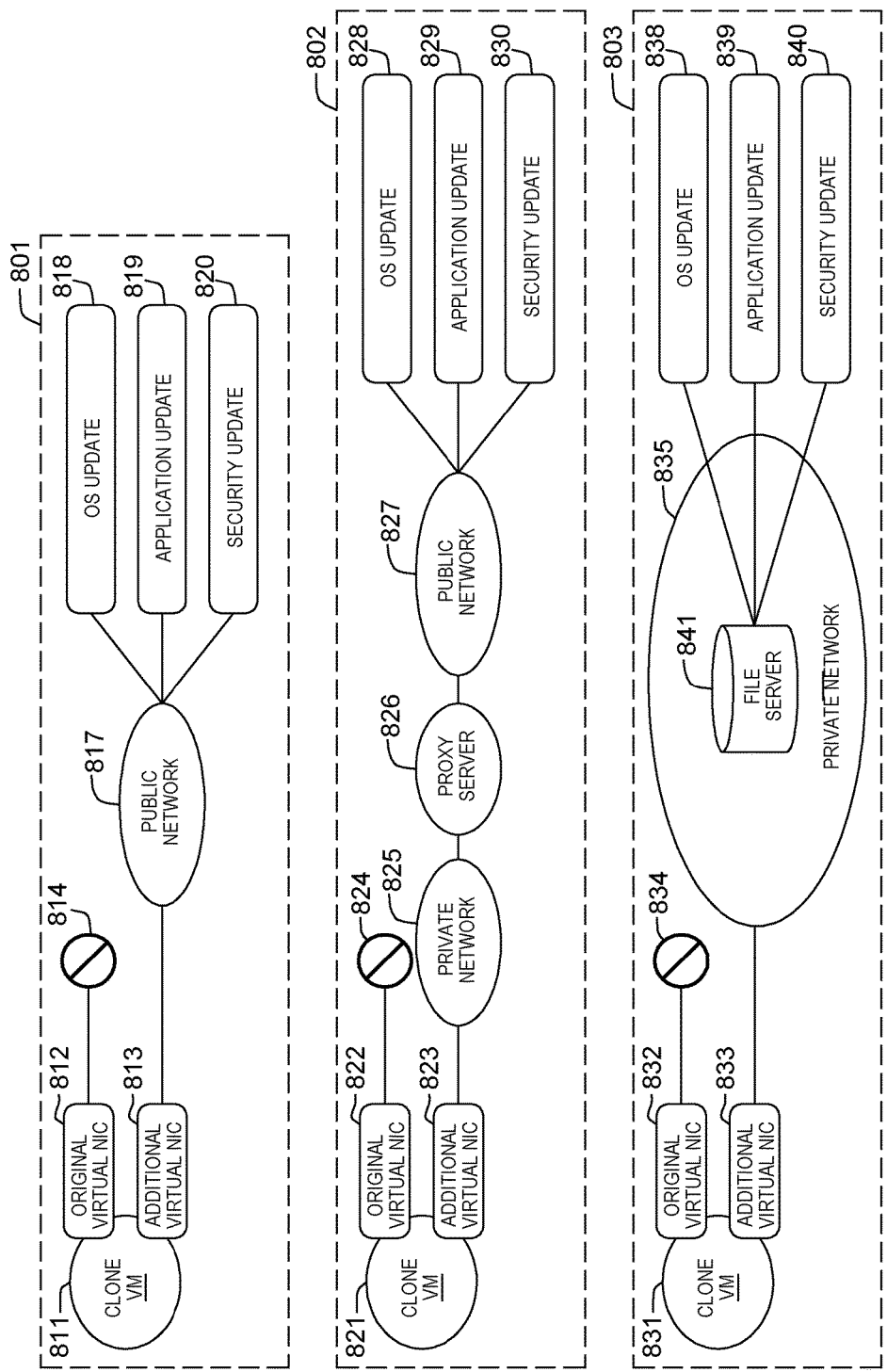
FIG. 8 is a diagram illustrating a process of applying update to a clone virtual machine via a network, according to an embodiment of the present invention.

FIG. 8 is a diagram illustrating a process of applying update to a clone virtual machine via a network, according to an embodiment of the present invention.

In an update aspect depicted in 801, the computer system 121 disables a virtual NIC (original virtual NIC) 812 originally connected to a clone virtual machine 811 (see 814). The computer system 121 then adds another virtual NIC 813 to the clone virtual machine 811. The computer system 121 uses an IP address assigned to the another virtual NIC 813 to connect to a public network 817. The computer system 121 then acquires, for example, OS update 818, application update 819, or security update 820 via the public network 817 and applies the acquired update to the clone virtual machine.

In an update aspect depicted in 802, the computer system 121 disables a virtual NIC (original virtual NIC) 822 originally connected to a clone virtual machine 821 (see 824). The computer system 121 then adds another virtual NIC 823 to the clone virtual machine 821. The computer system 121 uses an IP address assigned to the another virtual NIC 823 to connect to a private network 825. The private network 825 is connected to a public network 827 via a proxy server 826. The computer system 121 then acquires, for example, OS update 828, application update 829, or security update 830 via the private network 825, the proxy server 826, and the public network 827 and applies the acquired update to the clone virtual machine 821.

In an update aspect depicted in 803, the computer system 121 disables a virtual NIC (original virtual NIC) 832 originally connected to a clone virtual machine 831 (see 834). The computer system 121 then adds another virtual NIC 833 to the clone virtual machine 831. The computer system 121 uses an IP address assigned to the another virtual NIC 833 to connect to a private network 835. The private network 835 has a file server 841. The file server 841 stores for example, OS update 838, application update 839, or security update 840. The computer system 121 then acquires, for example, the OS update 838, the application update 839, or the security update 840 from the file server 841 in the private network 835, and applies the acquired update to the clone virtual machine 831.

Figure 9:
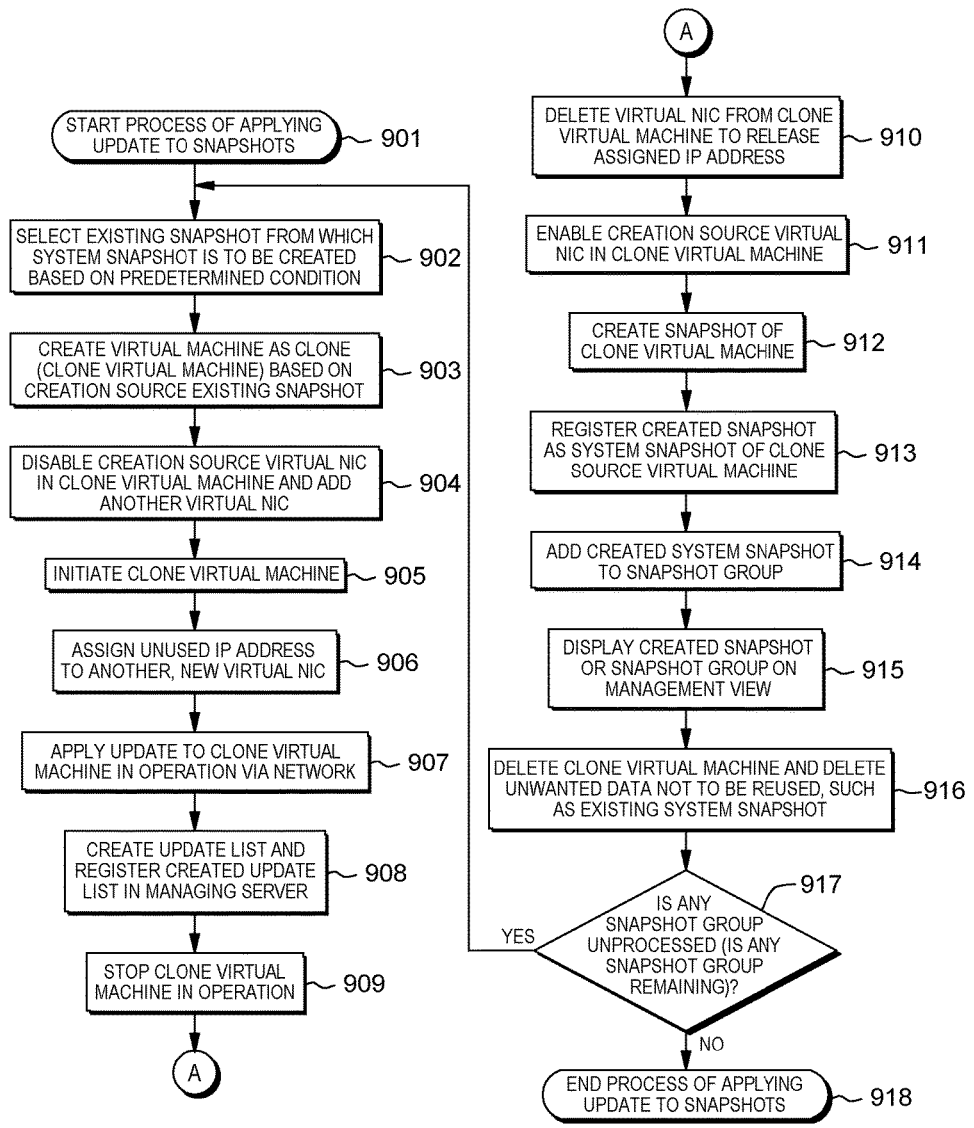
FIG. 9 is a flowchart for a process of automatically applying update to an existing snapshot, according to an embodiment of the present invention.

FIG. 9 is a flowchart for a process of automatically applying update to an existing snapshot, according to an embodiment of the present invention.

In step 901, the computer system 121 starts a process of applying a fix to snapshots of a virtual machine. The process of applying the fix may be executed, for example, periodically, upon receiving a notification of the update, or using the user's action (at any timing) as a trigger.

Figure 10A:
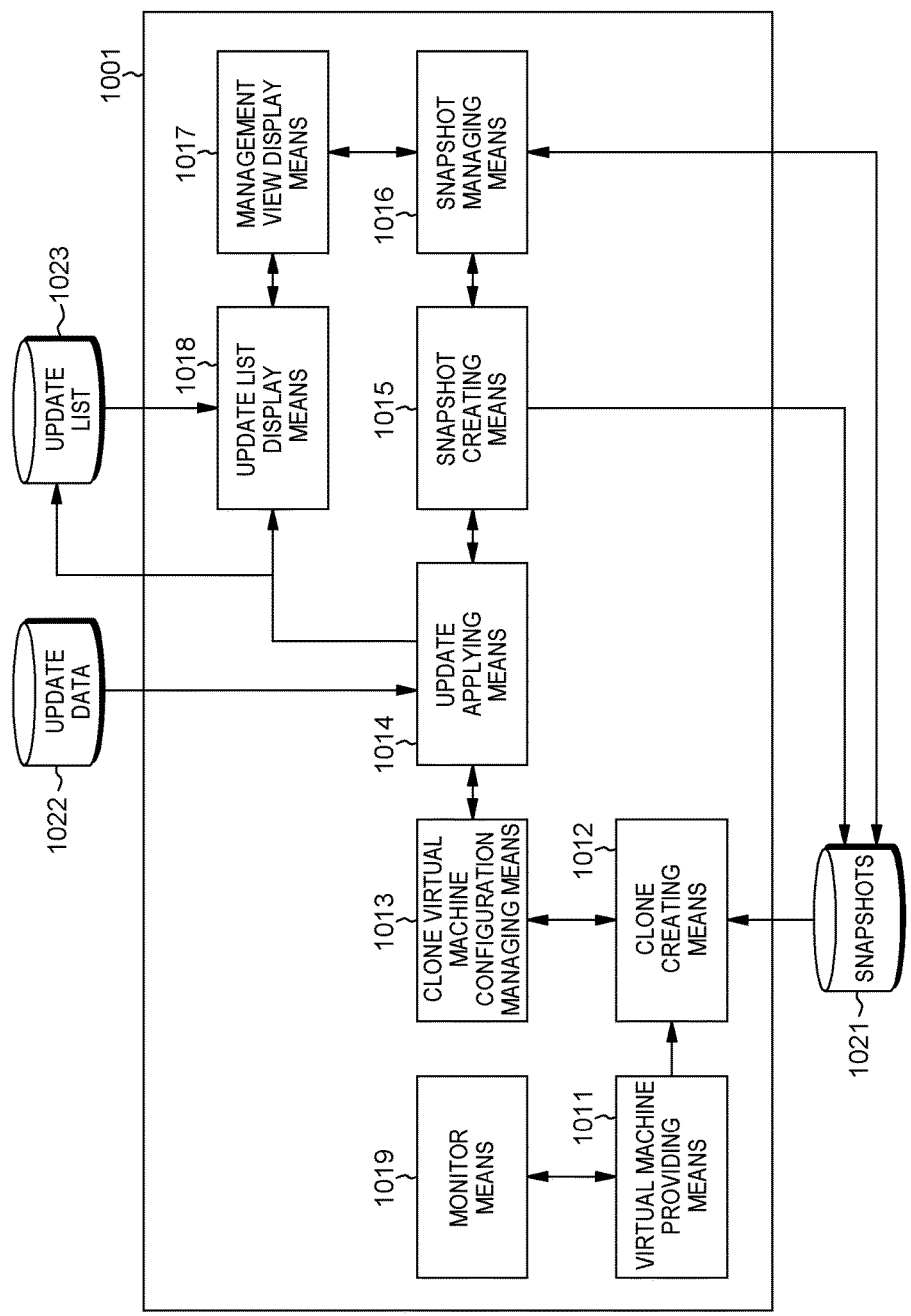
FIG. 10A is a diagram depicting an example of a functional block diagram of a computer system preferably including a hardware configuration according to FIG. 1A or FIG. 1B and configured to automatically apply update to snapshots of a virtual machine, according to an embodiment of the present invention, the computer system including one server computer.
Figure 10B:
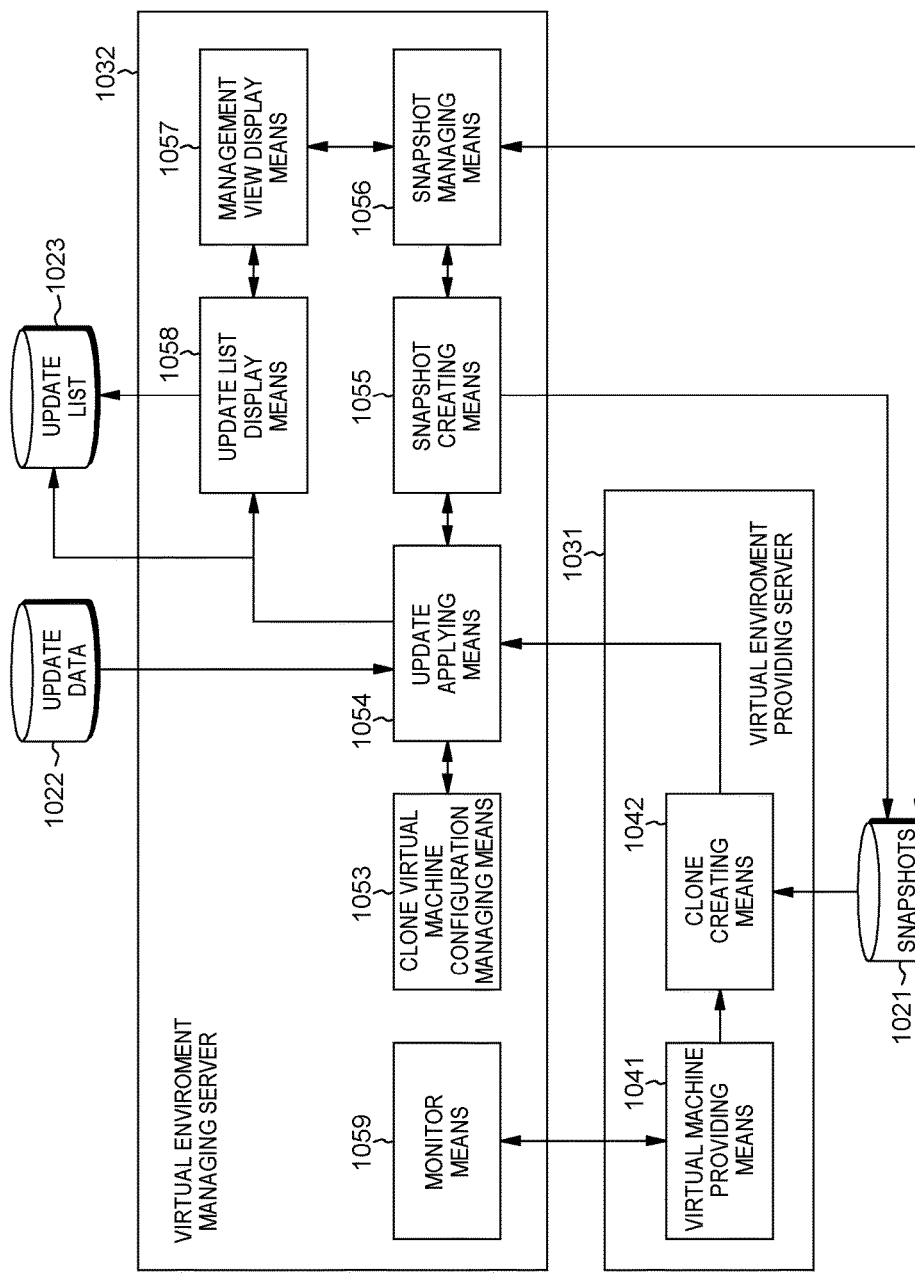
FIG. 10B is a diagram depicting an example of a functional block diagram of a computer system preferably including a hardware configuration according to FIG. 1A or FIG. 1B and configured to automatically apply update to snapshots of a virtual machine, according to an embodiment of the present invention, the computer system including a plurality of server computers.

In step 902, in response to a predetermined trigger, the computer system 121 selects an existing snapshot serving as a source for taking of a system snapshot based on a predetermined condition. The existing snapshot may be an existing user snapshot or an existing system snapshot. The existing snapshot may be a storage medium in which the existing snapshot is stored (for example, a storage medium 1021 in which existing snapshots are stored as illustrated in FIG. 10A and FIG. 10B). Selection of the existing snapshot is also a timing when a system snapshot is obtained from the existing snapshot.

The predetermined trigger may be regular time intervals. The time intervals may be set to any time interval by a user administering the virtual system.

Furthermore, the predetermined trigger may be reception of the notification of the update to the computer system 121.

Furthermore, the predetermined trigger may be control information on the taking frequency or usage frequency of an existing snapshot (group) or a snapshot (group) associated with the existing snapshot (group). It is assumed that, for example, a snapshot A and a snapshot B are available. In this case, the control information may be such that, while the snapshot A is acquired once, the snapshot B is acquired three times. Furthermore, it is assumed that, for example, a snapshot A group and a snapshot B group are available. In this case, the control information may be such that, while a snapshot belonging to the snapshot A group is acquired once, a snapshot belonging to the snapshot B group is acquired three times. Additionally, it is assumed that, for example, a snapshot A and a snapshot B are available. The control information may be such that, while the snapshot A is utilized as a virtual machine once, the snapshot B is utilized as a virtual machine three times. In addition, it is assumed that, for example, a snapshot A group and a snapshot B group are available. The control information may be such that, while a snapshot belonging to the snapshot A group is utilized as a virtual machine once, a snapshot belonging to the snapshot B group is utilized as a virtual machine three times.

Furthermore, the predetermined trigger may be the user's action. The action may be selection, by the user, of a menu provided by a menu in the management view (for example, a start menu for an update applying process).

The predetermined condition for selection of an existing snapshot may be, for example, a priority associated with the existing snapshot. When the existing snapshot is a user snapshot, the computer system 121 may use the priority applied to the user snapshot. When the existing snapshot is a system snapshot, the computer system 121 may utilize a priority applied to a user snapshot from which the system snapshot is derived, as a priority for the system snapshot.

Furthermore, the predetermined condition may be, for example, the usage frequency or usage time of each of the existing snapshots as a virtual machine. The usage frequency may be the frequency at which the virtual machine is initiated using the existing snapshot. The usage time may be an amount of time for which the virtual machine is initiated using the existing snapshot as a virtual machine and the virtual machine in operation is utilized. The usage frequency or the usage time may be the usage frequency or usage time of one particular snapshot or all or some of the snapshots belonging to a certain snapshot group. When the usage frequency or usage time of all of the snapshots belonging to a certain snapshot group is adopted, the certain snapshot group may be in a high degree of importance. When the usage frequency or usage time of some of the snapshots belonging to a certain snapshot group is adopted, the certain snapshot group may be in a low degree of importance.

Furthermore, the predetermined condition may be the snapshot taking frequency of the existing snapshot. The snapshot taking frequency may be, when a virtual machine is created based on the existing snapshot, the number of times by which a user snapshot taken while the created machine is in operation is acquired, the number of times by which a system snapshot taken while the created machine is in operation is acquired, or the number of times by which a combination of the user snapshot and the system snapshot is acquired.

By monitoring the usage frequency or usage time of an existing snapshot or the snapshot taking frequency of the existing snapshot, the computer system 121 may acquire the usage frequency, the usage time, or the taking frequency.

In step 903, based on the creation source existing snapshot selected in step 902, the computer system 121 creates a clone of the virtual machine (clone virtual machine) that reproduces a state identical to the state of the existing snapshot.

In step 904, the computer system 121 disables the creation source virtual NIC in the clone virtual machine created in step 903, and instead adds another, new virtual NIC. In disabling the creation source virtual NIC, the computer system 121 maintains an IP address assigned to the creation source virtual NIC without any change. Disabling the creation source virtual NIC in the clone virtual machine is performed by, for example, disconnecting the virtual NIC from the network or preventing the virtual NIC from being recognized by the operating system for the clone virtual machine when the clone virtual machine is initiated. When the virtual NIC is prevented from being recognized by the operating system for the clone virtual machine when the clone virtual machine is initiated, it may appear to the operating system that the virtual NIC is temporarily deleted. In such a case, in step 911 described below, an IP address prevented from being recognized by the operating system and optionally any other needed information (for example, a host name, a default gateway, a subnet mask, or a DNS server) need to be correctly re-set.

In step 905, the computer system 121 initiates the clone virtual machine.

Step 905 and step 904 may be executed in the reverse order. That is, the computer system 121 may initiate the clone virtual machine and then disable the creation source virtual NIC in the initiated clone virtual machine and instead add another, new virtual NIC.

In step 906, the computer system 121 assigns an unused IP address to the another, new virtual NIC added in step 904. Furthermore, the computer system 121 may use a DHCP to automatically assign the unassigned IP address to the another, new virtual NIC added in step 904. Additionally, the computer system 121 may not only assign the unused IP address to the another virtual NIC but also provide any other needed information (for example, a host name, a default gateway, a subnet mask, or a DNS server).

In step 907, the computer system 121 applies updates to the clone virtual machine with the virtual NIC added thereto via the network. In particular, the computer system 121 may apply update to the clone virtual machine with the virtual NIC added thereto via the network, using the IP address of the clone virtual machine assigned in step 906.

In step 908, the computer system 121 may create an update information list that is the result of the update in step 907 and register the created update information list, for example, in a managing server (for example, a storage medium in which the update information list is stored).

In step 909, the computer system 121 stops the clone virtual machine in operation on which update has been completely performed. Stoppage of the clone virtual machine in operation refers to a state in which data on the clone virtual machine remains on a disk for the computer system 121 and in which only the virtual resources such as the virtual CPU and the virtual memory are released. That is, the stoppage refers to a state in which the clone virtual machine can be initiated again using the data on the clone virtual machine remaining on the disk. The computer system 121 may release the virtual hardware used by the stopped clone virtual machine.

In step 910, the computer system 121 deletes the virtual NIC added in step 904 from the clone virtual machine to release the assigned IP address. This is because, when the virtual NIC added in step 904 is not deleted from the clone virtual machine, if a snapshot is taken in step 912 described below, difference information is recorded so as to indicate that the virtual NIC has been changed.

In step 911, the computer system 121 enables the creation source virtual NIC in the clone virtual machine that has been disabled in step 904. Enabling the creation source virtual NIC disabled in step 904 also enables the use of the IP address assigned to the creation source virtual NIC. Furthermore, enabling the creation source virtual NIC disabled in step 904 prevents, if a snapshot is taken in step 912 described below, difference information from being recorded so as to indicate that the virtual NIC remains the same and unchanged.

In step 912, the computer system 121 takes a snapshot of the clone virtual machine with the enabled virtual NIC. As a method for taking a snapshot, any technique known to those skilled in the art may be used.

In step 913, the computer system 121 registers the snapshot taken in step 912 as a system snapshot of the clone source virtual machine. That is, the computer system 121 takes a snapshot of the clone source virtual machine by taking a snapshot of the clone virtual machine with the enabled virtual NIC.

In step 914, optionally, the computer system 121 may add the taken system snapshot to the creation source snapshot group of the system snapshot.

In step 915, optionally, the computer system 121 may display, on the management view, the system snapshot taken in step 912 or the snapshot group with the taken system snapshot added thereto. The user can, for example, revert the grouped snapshots or set a priority for the snapshot, on the management view.

In step 916, optionally, the computer system 121 may delete the clone virtual machine and delete unwanted data not to be reused such as any existing snapshot and the update information list associated with the existing system snapshot. The deletion of the clone virtual machine, unlike the stoppage of the clone virtual machine described above in step 909, refers to disabling the clone virtual machine from being initiated again.

In step 917, the computer system 121 determines whether any of the snapshot groups to be processed during one concurrent update process has been unprocessed (that is, whether any of the snapshot groups remains). If any snapshot group is unprocessed, the computer system 121 correspondingly returns the process to step 902. When the process is returned to step 902, the computer system 121 repeats the processing in steps 902 to 916 for the unprocessed snapshot group. On the other hand, if no snapshot group is unprocessed, the computer system 121 correspondingly advances the process to an end step 918.

In step 918, the computer system 121 ends the process of applying fix to the snapshots of the virtual machine.

FIG. 10A and FIG. 10B are each a diagram depicting an example of a functional block diagram of a computer system preferably including a hardware configuration according to FIG. 1A or FIG. 1B and configured to automatically apply update to snapshots of a virtual machine, according to an embodiment of the present invention. The computer system 121 may include one or more server computers.

FIG. 10A is a diagram depicting an example of a functional block diagram in which the computer system 121 includes one server computer.

The computer system 1001 may include the computer system 101 according to FIG. 1A or FIG. 1B or the computer system 121 according to FIG. 1B.

The computer system 1001 includes at least one of virtual machine providing means 1011, clone creating means 1012, clone virtual machine configuration managing means 1013, update applying means 1014, snapshot taking means 1015, and optionally snapshot managing means 1016, management view display means 1017, update information list display means 1018, and monitor means 1019.

The virtual machine providing means 1011 may provide operation of one or more virtual machines on the server computer.

Furthermore, the virtual machine providing means 1011 may provide operation of the virtual machine based on snapshots.

Additionally, the virtual machine providing means 1011 may execute the processing in steps 905 and 909 depicted in FIG. 9 and the processing in a part of step 916 (deletion of the clone virtual machine).

The clone creating means 1012 creates a clone of the virtual machine (clone virtual machine) that reproduces a state identical to the state of an existing snapshot. In creating a clone virtual machine, the clone creating means 1012 may read the existing snapshot from a storage medium 1021 in which the existing snapshot is stored.

Furthermore, the clone creating means 1012 may select an existing snapshot from which a clone virtual machine is created, from a plurality of existing snapshots, in accordance with the priority associated with the existing snapshot, in accordance with control information on the taking frequency or usage frequency of the existing snapshot or a snapshot associated with the existing snapshot, or in accordance with the usage frequency or usage time of the existing snapshot or the snapshot taking frequency of the existing snapshot.

Additionally, in response to selection of grouped system snapshots, the clone creating means 1012 may create a clone of the virtual machine that reproduces a state identical to the state of the latest one of the grouped system snapshots.

In addition, the clone creating means 1012 executes the processing in steps 902 and 903 depicted in FIG. 9.

The clone virtual machine configuration managing means 1013 disables the virtual NIC in the clone virtual machine and adds another virtual NIC.

Furthermore, the clone virtual machine configuration managing means 1013 deletes the another virtual NIC from the clone virtual machine to which the update provided by the update applying means 1014 is applied, to enable the disabled virtual NIC.

Additionally, the clone virtual machine configuration managing means 1013 may initiate the clone virtual machine with the another virtual NIC added thereto and assign an unused IP address to the another virtual NIC.

In addition, the clone virtual machine configuration managing means 1013 may disable the virtual NIC in the clone virtual machine by disconnecting the virtual NIC from the network or preventing the virtual NIC from being recognized by the operating system for the clone virtual machine when the clone virtual machine is initiated.

Furthermore, the clone virtual machine configuration managing means 1013 may enable the disabled virtual NIC by connecting the disabled virtual NIC to the network, adding the disabled virtual NIC or allowing the disabled virtual NIC to be recognized by the operating system for the clone virtual machine.

Additionally, the clone virtual machine configuration managing means 1013 may execute the processing in steps 904 and 906 depicted in FIG. 9 and the processing in steps 910 and 911 also depicted in FIG. 9.

The update applying means 1014 applies update to the clone virtual machine with the another virtual NIC added thereto via the network. The update applying means may utilize update data 1022.

In addition, the update applying means 1014 may perform the update using the IP address assigned to the another virtual NIC.

Furthermore, the update applying means 1014 may store the results of the update in a storage medium 1023 in which the update information list is stored.

Additionally, the update applying means 1014 may execute the processing in steps 907 and 908 depicted in FIG. 9.

The snapshot taking means 1015 takes a snapshot of the clone virtual machine with the enabled virtual NIC to take a snapshot of the clone source virtual machine.

In addition, the snapshot taking means 1015 may execute the processing in step 912 depicted in FIG. 9.

The snapshot managing means 1016 merges at least two snapshots taken in the step of taking a snapshot of the clone source virtual machine.

Furthermore, the snapshot managing means 1016 may group a user snapshot taken in accordance with the user's instruction and a system snapshot resulting from taking of a snapshot of the clone source virtual machine.

Additionally, the snapshot managing means 1016 may merge one or more system snapshots of the grouped system snapshots which are not the latest with the latest system snapshot and delete the one or more system snapshots that are not the latest.

In addition, the snapshot managing means 1016 may execute the processing in step 913, steps 914 and 915, and a part of step 916 (processing associated with snapshots, for example, deletion of unwanted data in an existing system snapshot or user snapshot which data is not to be reused).

The management view display means 1017 displays a snapshot group resulting from grouping of a user snapshot and system snapshots.

Furthermore, when the existing snapshot of the clone source virtual machine is the user snapshot, the management view display means 1017 may display, on the management view, the system snapshot taken from the clone virtual machine in the user snapshot in association with the user snapshot of the clone source virtual machine.

Additionally, when the existing snapshot of the clone source virtual machine is the system snapshot, the management view display means 1017 may display, on the management view, the system snapshot taken from the clone virtual machine in the system snapshot in association with the system snapshot of the clone source virtual machine.

In addition, the management view display means 1017 may execute, for example, processing on the management view which enables the user to select a user snapshot, for example, in step 902 depicted in FIG. 9.

The update information list display means 1018 displays an update information list of the update performed by the update applying means 1014 on the management view. The update information list display means 1018 may read the update information list from the storage medium 1023 in which the update information list is stored.

Furthermore, the update information list display means 1018 may display the update information list of the update performed by the update applying means 1014 in association with the snapshot to which the update is applied.

Additionally, the update information list display means 1018 may execute the processing for displaying, on the management view, the update information list created in step 908 depicted in FIG. 9.

The monitor means 1019 monitors the usage frequency or usage time of the existing snapshot or the snapshot taking frequency of the existing snapshot.

In addition, the monitor means 1019 may execute the processing of monitoring the usage frequency or usage time of the existing snapshot or the snapshot taking frequency of the existing snapshot in order to allow selection of the existing snapshot in step 902 depicted in FIG. 9.

FIG. 10B is a diagram depicting an example of a functional block diagram of a case where the computer system 121 includes a plurality of (for example, two) server computers.

The computer system 121 includes a virtual environment providing server 1031 and a virtual environment managing server 1032.

The virtual environment providing server 1031 includes virtual machine providing means 1041 and clone creating means 1042.

The virtual machine providing means 1041 and the clone creating means 1042 correspond to the virtual machine providing means 1011 and the clone creating means 1012, respectively, illustrated in FIG. 10A. Thus, for the description of the virtual machine providing means 1041 and the clone creating means 1042, see the description of the corresponding means illustrated in FIG. 10A.

The virtual environment managing server 1032 includes clone virtual machine configuration managing means 1053, update applying means 1054, snapshot taking means 1055, and optionally snapshot managing means 1056, management view display means 1057, update information list display means 1058, and monitor means 1059.

The clone virtual machine configuration managing means 1053, the update applying means 1054, the snapshot taking means 1055, the snapshot managing means 1056, the management view display means 1057, the update information list display means 1058, and the monitor means 1059 correspond to the clone virtual machine configuration managing means 1013, the update applying means 1014, the snapshot taking means 1015, the snapshot managing means 1016, the management view display means 1017, the update information list display means 1018, and the monitor means 1019, respectively, illustrated in FIG. 10A. Thus, for the description of each of the following: the clone virtual machine configuration managing means 1053, the update applying means 1054, the snapshot taking means 1055, the snapshot managing means 1056, the management view display means 1057, the update information list display means 1058, and the monitor means 1059, see the description of the corresponding means illustrated in FIG. 10A.

What is claimed is:

1. A computer implemented method for applying an update to a snapshot of a virtual machine executed by a hardware processor, the method comprising:

creating a cloned virtual machine reproducing a state of an existing first snapshot of a virtual machine, wherein the creating the cloned virtual machine further comprises selecting the existing first snapshot of a plurality of existing snapshots based on, at least, a priority associated with the existing first snapshot and a usage frequency for the existing first snapshot;

disabling a first virtual network interface card (NIC) in the cloned virtual machine, wherein the disabling the first virtual NIC comprises disconnecting the first virtual NIC from a network;

adding a second virtual NIC to the cloned virtual machine, wherein the adding the second virtual NIC to the cloned virtual machine further comprises initiating the cloned virtual machine to which the second virtual NIC has been added and assigning an unused internet protocol (IP) address to the second virtual NIC;

applying, via the network, an update to the cloned virtual machine having the added second virtual NIC, wherein the update is applied using the unused IP address assigned to the second virtual NIC and the update comprises a security update to maintain security for the virtual machine and the security update comprises an update of a definition file for security software, wherein the security software is anti-virus software;

deleting the second virtual NIC;

enabling the first virtual NIC; and generating a snapshot of the updated cloned virtual machine and the first virtual NIC, wherein the snapshot is associated with the virtual machine and the snapshot is a data set in which only information on differences from a directly preceding snapshot is stored.

* * * * *